United States Patent
Cherian et al.

(10) Patent No.: US 9,510,271 B2
(45) Date of Patent: Nov. 29, 2016

(54) SYSTEMS, APPARATUS, AND METHODS FOR ADDRESS FORMAT DETECTION

(71) Applicant: Qualcomm Incorporated, San Diego, CA (US)

(72) Inventors: George Cherian, San Diego, CA (US); Mahesh D Iyer, Saratoga, CA (US); Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 13/830,706

(22) Filed: Mar. 14, 2013

(65) Prior Publication Data

US 2014/0064184 A1 Mar. 6, 2014

Related U.S. Application Data

(60) Provisional application No. 61/695,253, filed on Aug. 30, 2012.

(51) Int. Cl.
*H04W 48/16* (2009.01)
*H04L 29/12* (2006.01)

(52) U.S. Cl.
CPC ............ *H04W 48/16* (2013.01); *H04L 61/103* (2013.01)

(58) Field of Classification Search
CPC ... H04W 24/02; H04W 48/18; H04W 48/16; H04W 24/10; H04L 5/0053; H04L 41/12; H04L 45/02; H04L 41/0803; H04L 12/4633; H04L 67/02; H04L 65/80; H04L 67/06; H04L 47/10
USPC .................................. 370/328, 254; 709/236
See application file for complete search history.

(56) References Cited

U.S. PATENT DOCUMENTS

| 7,336,923 B2 | 2/2008 | Yadav |
| 7,362,722 B2 | 4/2008 | Otsuka |

(Continued)

FOREIGN PATENT DOCUMENTS

| EP | 1126636 A2 | 8/2001 |
| EP | 1341346 A2 | 9/2003 |

(Continued)

OTHER PUBLICATIONS

3GPP TSG-RAN1 #58; Considerations on using Type II relay for UL transmission, Fujitsu, 3GPP, R1-093159, pp. 1-3, Shenzhen, China, Aug. 24-28, 2009.

(Continued)

*Primary Examiner* — Andrew Chriss
*Assistant Examiner* — Atique Ahmed
(74) *Attorney, Agent, or Firm* — Kevin T. Cheatham

(57) ABSTRACT

Systems, methods, and devices for address format detection are described herein. In one aspect, a method of detecting whether an addressing format is supported by an access point on a wireless network is disclosed. The method includes transmitting a request to an access point using an addressing format including a source address field and a separate transmitter address field. In some aspects, the request may be an address resolution protocol (ARP) request or an Internet Control Message Protocol (ICMP) ping request. The request includes the source address field set to a first address and the transmitter address field set to a second address; monitoring transmissions of the access point to determine whether the access point transmits a response to the request that includes a destination address equal to the first address; and determining whether the access point supports the addressing format based on the monitoring.

34 Claims, 23 Drawing Sheets

(56) References Cited

U.S. PATENT DOCUMENTS

| | | | |
|---|---|---|---|
| 8,131,209 B1 | 3/2012 | Chen et al. | |
| 8,201,044 B2 | 6/2012 | Chang et al. | |
| 8,228,836 B2 | 7/2012 | Erkip et al. | |
| 8,243,623 B2 | 8/2012 | Gong et al. | |
| 2003/0208616 A1* | 11/2003 | Laing et al. | 709/236 |
| 2004/0196819 A1 | 10/2004 | Lin et al. | |
| 2005/0195753 A1* | 9/2005 | Chaskar et al. | 370/254 |
| 2005/0195819 A1 | 9/2005 | Goto et al. | |
| 2005/0232211 A1* | 10/2005 | Abhishek | H04W 88/08 370/338 |
| 2006/0084377 A1 | 4/2006 | Lee et al. | |
| 2006/0146752 A1 | 7/2006 | Jang et al. | |
| 2007/0072600 A1 | 3/2007 | Cho et al. | |
| 2007/0081479 A1 | 4/2007 | Kang et al. | |
| 2007/0127367 A1 | 6/2007 | Ogasahara et al. | |
| 2007/0189283 A1 | 8/2007 | Agarwal et al. | |
| 2007/0248065 A1 | 10/2007 | Banerjea et al. | |
| 2007/0253395 A1 | 11/2007 | Graves et al. | |
| 2008/0013459 A1 | 1/2008 | Do et al. | |
| 2008/0025259 A1* | 1/2008 | Ponnuswamy | H04W 24/00 370/331 |
| 2008/0057973 A1 | 3/2008 | Park | |
| 2008/0137581 A1 | 6/2008 | Doppler et al. | |
| 2008/0162516 A1 | 7/2008 | Shinomiya | |
| 2008/0188177 A1 | 8/2008 | Tan et al. | |
| 2008/0205385 A1 | 8/2008 | Zeng et al. | |
| 2008/0221988 A1 | 9/2008 | Bappu et al. | |
| 2008/0232256 A1 | 9/2008 | Douglas et al. | |
| 2008/0247399 A1 | 10/2008 | Hazard | |
| 2008/0310348 A1 | 12/2008 | Nandagopalan et al. | |
| 2008/0316954 A1 | 12/2008 | Zheng | |
| 2009/0028086 A1 | 1/2009 | Tay et al. | |
| 2009/0052327 A1 | 2/2009 | Larsson et al. | |
| 2009/0073945 A1 | 3/2009 | Seok | |
| 2009/0190515 A1* | 7/2009 | Finn | H04W 4/16 370/312 |
| 2009/0232096 A1* | 9/2009 | Taniuchi | 370/331 |
| 2009/0296578 A1 | 12/2009 | Bernard et al. | |
| 2009/0304008 A1 | 12/2009 | Kono et al. | |
| 2010/0027494 A1 | 2/2010 | Kwon et al. | |
| 2010/0035541 A1 | 2/2010 | Kim et al. | |
| 2010/0046417 A1 | 2/2010 | Tamura | |
| 2010/0046420 A1 | 2/2010 | Hart et al. | |
| 2010/0061272 A1* | 3/2010 | Veillette | H04L 45/34 370/254 |
| 2010/0142433 A1 | 6/2010 | Womack et al. | |
| 2010/0157821 A1 | 6/2010 | Morris | |
| 2010/0157845 A1 | 6/2010 | Womack et al. | |
| 2010/0167743 A1 | 7/2010 | Palanki et al. | |
| 2010/0177807 A1 | 7/2010 | Zhang | |
| 2010/0189044 A1* | 7/2010 | Roy et al. | 370/328 |
| 2010/0191839 A1 | 7/2010 | Gandhewar et al. | |
| 2010/0195665 A1 | 8/2010 | Jackson | |
| 2010/0198985 A1* | 8/2010 | Kanevsky et al. | 709/241 |
| 2010/0246480 A1 | 9/2010 | Aggarwal et al. | |
| 2010/0260096 A1 | 10/2010 | Ulupinar et al. | |
| 2010/0278185 A1 | 11/2010 | Jaerredal | |
| 2011/0002337 A1 | 1/2011 | Akahane et al. | |
| 2011/0007692 A1 | 1/2011 | Seok | |
| 2011/0032864 A1 | 2/2011 | Lee et al. | |
| 2011/0032924 A1 | 2/2011 | Lee et al. | |
| 2011/0038480 A1 | 2/2011 | Lin | |
| 2011/0051629 A1 | 3/2011 | Chun et al. | |
| 2011/0058551 A1 | 3/2011 | Fernandez | |
| 2011/0149804 A1 | 6/2011 | Denteneer et al. | |
| 2011/0228697 A1 | 9/2011 | Yano et al. | |
| 2011/0228755 A1 | 9/2011 | Seok | |
| 2011/0243062 A1 | 10/2011 | Wang et al. | |
| 2011/0244851 A1 | 10/2011 | Gunnarsson et al. | |
| 2011/0249609 A1 | 10/2011 | Brusilovsky et al. | |
| 2011/0292862 A1 | 12/2011 | Shimizu | |
| 2011/0305190 A1 | 12/2011 | Seki | |
| 2011/0305339 A1 | 12/2011 | Norrman et al. | |
| 2011/0310912 A1 | 12/2011 | Cai et al. | |
| 2012/0002589 A1 | 1/2012 | Saifullah et al. | |
| 2012/0008596 A1 | 1/2012 | Jung et al. | |
| 2012/0015659 A1 | 1/2012 | Kalyani et al. | |
| 2012/0051240 A1 | 3/2012 | Dwivedi et al. | |
| 2012/0051346 A1* | 3/2012 | Herbert et al. | 370/338 |
| 2012/0135677 A1 | 5/2012 | Hsu et al. | |
| 2012/0155301 A1 | 6/2012 | Miyazaki et al. | |
| 2012/0182878 A1 | 7/2012 | Qian | |
| 2012/0182926 A1 | 7/2012 | Yu et al. | |
| 2012/0188931 A1 | 7/2012 | Lee et al. | |
| 2012/0208545 A1 | 8/2012 | Yang et al. | |
| 2012/0218977 A1* | 8/2012 | Seok | 370/336 |
| 2012/0233331 A1* | 9/2012 | Voccio | G06F 9/45558 709/226 |
| 2012/0243483 A1 | 9/2012 | Ahmadi et al. | |
| 2012/0258688 A1 | 10/2012 | Mizukoshi | |
| 2012/0307685 A1 | 12/2012 | Kim et al. | |
| 2012/0314621 A1 | 12/2012 | Finn et al. | |
| 2012/0317619 A1 | 12/2012 | Dattagupta et al. | |
| 2013/0094429 A1* | 4/2013 | Seok | 370/312 |
| 2013/0114491 A1 | 5/2013 | Kim et al. | |
| 2013/0188542 A1 | 7/2013 | Merlin et al. | |
| 2013/0235760 A1 | 9/2013 | Merlin et al. | |
| 2013/0235788 A1 | 9/2013 | Abraham et al. | |
| 2013/0235789 A1 | 9/2013 | Abraham et al. | |
| 2013/0235790 A1 | 9/2013 | Abraham et al. | |
| 2013/0235791 A1 | 9/2013 | Abraham et al. | |
| 2013/0235792 A1 | 9/2013 | Abraham et al. | |
| 2013/0336196 A1 | 12/2013 | Abraham et al. | |
| 2014/0003426 A1 | 1/2014 | Sankar et al. | |
| 2014/0064196 A1 | 3/2014 | Abraham et al. | |
| 2014/0086215 A1 | 3/2014 | Duo et al. | |

FOREIGN PATENT DOCUMENTS

| | | |
|---|---|---|
| EP | 1732265 A1 | 12/2006 |
| EP | 1924009 A1 | 5/2008 |
| TW | I233731 B | 6/2005 |
| WO | 03096554 A2 | 11/2003 |
| WO | 2004032426 A1 | 4/2004 |
| WO | 2007046630 A2 | 4/2007 |
| WO | WO-2007063521 A2 | 6/2007 |
| WO | 2008045632 A1 | 4/2008 |
| WO | WO-2008038247 A2 | 4/2008 |
| WO | WO-2009106616 A1 | 9/2009 |
| WO | WO-2010143894 A2 | 12/2010 |

OTHER PUBLICATIONS

Bahr M., "Proposed Routing for IEEE 802.11s WLAN Mesh Networks," WICON '06 The 2nd Annual International Wireless Internet Conference, Aug. 2-5, 2006, 10 pages.

Cerutti I., et al., "Delay Model of Single-Relay Cooperative ARQ Protocols in Slotted Radio Networks with Non-Instantaneous Feedback and Poisson Frame Arrivals," 2007, IEEE, pp. 2276-2280.

D-Link Forum BETA, Bridge Mode vs Relay vs Access Point (AP) / Routers vs Dedicated Acess Points (AP), URL: <http://forums.dlink.com/index.php?topic=50738.0>, Retrieved on Jan. 22, 2013, 2 Pages.

Jain, "Wireless Mesh and Multi-Hop Relay Networks", Washington University, St. Louis, 2010, 24pgs.

Lee M.J., et al., "Emerging Standards for Wireless Mesh Technology," Wireless Mesh Networking, IEEE Wireless Communications, IEEE, Apr. 2006, pp. 56-63.

International Search Report and Written Opinion—PCT/US2013/056962—ISA/EPO—Feb. 17, 2014.

SA3: "Living Document on Key Security Issues of Relay Node Architectures", 3GPP Draft; S3-101106-CLEAN, 3rd Generation Partnership Project (3GPP), Mobile Competence Centre ; 650, Route Des Lucioles ; F-06921 Sophia-Antipolis Cedex ; France, vol. SA WG3, No. Riga; 20100927, Oct. 7, 2010 (Oct. 7, 2010), XP050459845, [retrieved on Oct. 7, 2010].

Wei H-Y et al., "Two-Hop-Relay Architecture for Nextgeneration WWAN/WLAN Integration", IEEE Wireless Communications, IEEE Service Center, Piscataway, NJ, US, vol. 11, No. 2, Apr. 1, 2004 (Apr. 1, 2004), pp. 24-30, XP001196396, ISSN: 1536-1284, DOI: 10.1109/MWC.2004.1295734.

(56) References Cited

OTHER PUBLICATIONS

Kumar, et al., "Technical Issues in IEEE 802.16j Mobile Multi-Hop Relay (MMR) Networks", European Journal of Scientific Research, 2011, pp. 507-533.
Aust S., et al., "IEEE 802.11ah: Advantages in standards and further challenges for sub 1 GHz Wi-Fi", Communications (ICC), 2012 IEEE International Conference on, IEEE, Jun. 10, 2012 (Jun. 10, 2012), pp. 6885-6889, XP032274723, DOI: 10.1109/ICC.2012.6364903 ISBN: 978-1-4577-2052-9 the whole document.
He X., et al., "Cooperative RTS/CTS MAC with relay selection in distributed wireless networks", Ultra Modern Telecommunications &Workshops, 2009, ICUMT '09, International Conference on, IEEE, Piscataway, NJ, USA, Oct. 12, 2009 (Oct. 12, 2009), pp. 1-8, XP031574263, ISBN: 978-1-4244-3942-3 the whole document.
Kim D.W., et al., "A Robust and Cooperative MAC Protocol for IEEE 802.11a Wireless Networks", Wireless Personal Communications, Kluwer Academic Publishers, DO, vol. 67, No. 3, Sep. 23, 2011 (Sep. 23, 2011), pp. 689-705, XP035131529, ISSN: 1572-834X, DOI: 10.1007/S11277-011-0405-5 p. 696-p. 697.
Lim W.S., et al., "PR-MAC: A practical approach for exploiting relay transmissions in multi-rate WLANs", IEEE Transactions on Wireless Communications, IEEE Service Center, Piscataway, NJ, US, vol. 9, No. 1, Jan. 1, 2010 (Jan. 1, 2010), pp. 66-71, XP011299450, ISSN: 1536-1276 the whole document.
Wei, H. and Gitlin, R. "WWANIWLAN Two-Hop-Relay Architecture for Capactiy Enhancement" WCNC 2004 I IEEE Communications Society. 2004. pp. 225-230.
Zhu H., et al.,"Gamma DCF: A Relay-enabled Medium Access Control Protocol for Wireless Ad Hoc Networks", Mobile Computing, IEEE Transactions on Sep. 2006, U.S.A., IEEE, Sep. 2006, vol. 5, Issue:9, pp. 1201-1214.

\* cited by examiner

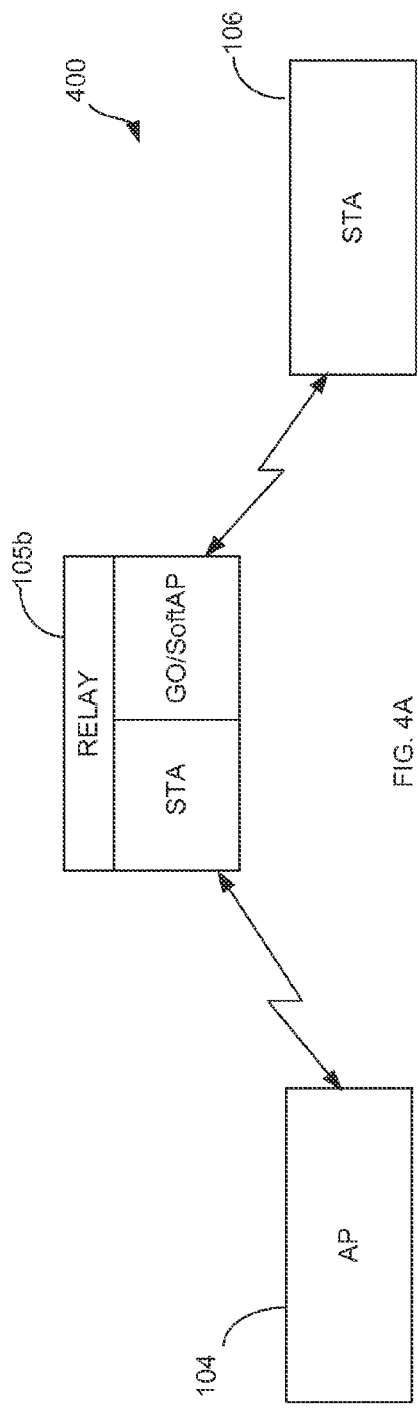
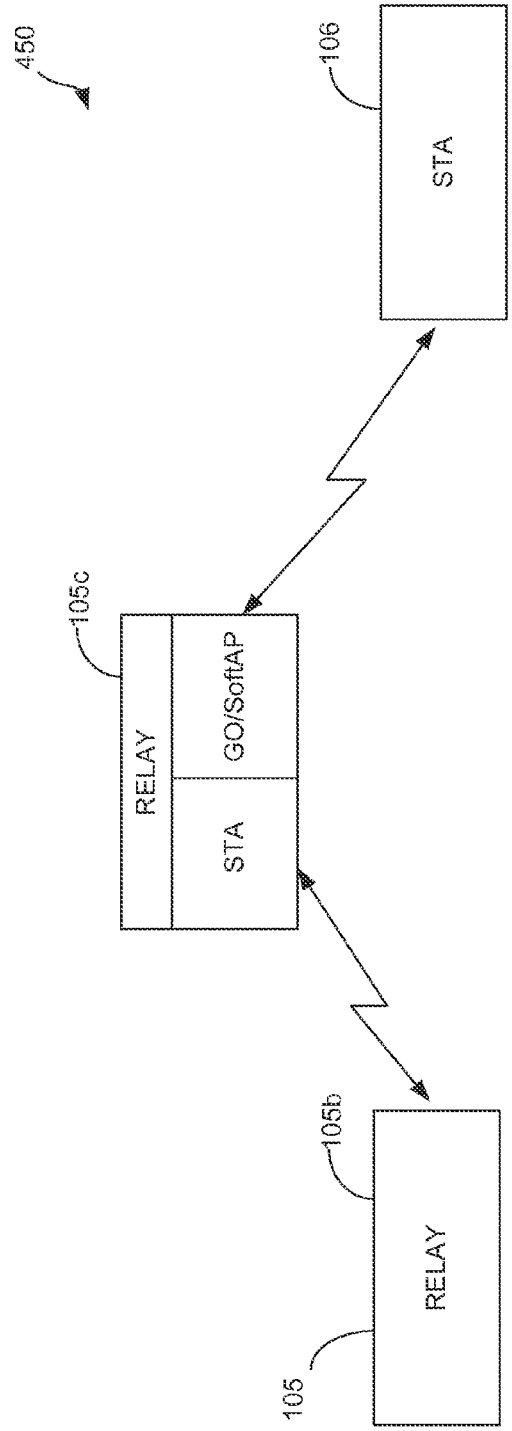
FIG. 4A
FIG. 4B

SYSTEMS, APPARATUS, AND METHODS FOR ADDRESS FORMAT DETECTION

CROSS REFERENCE TO RELATED APPLICATIONS

This application claims the benefit of U.S. Provisional Application 61/695,253 filed Aug. 30, 2012, and entitled "SYSTEMS, APPARATUS, AND METHODS FOR RANGE EXTENSION OF WIRELESS COMMUNICATION." The disclosure of this provisional application is hereby incorporated by reference in its entirety.

BACKGROUND

1. Field

The present application relates generally to wireless communications, and more specifically to systems, methods, and devices for using a relay in a wireless communication network.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. In some aspects, the devices on a wireless network may have a limited transmission range. Thus, improved systems, methods, and devices for communicating in a wireless network are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between access points and stations in a wireless network.

One aspect disclosed is a method for cloning an access point in a wireless communications network. The method includes receiving a service set identifier from an access point, transmitting an association request to the access point, transmitting an access point password to the access point, and transmitting the service set identifier in a beacon signal.

Another aspect disclosed is an apparatus for cloning an access point in a wireless communications network. The apparatus includes means for receiving a service set identifier from an access point, means for transmitting an association request to the access point, means for transmitting an access point password to the access point, and means for transmitting the service set identifier in a beacon signal.

Another aspect disclosed is non-transitory, computer readable medium comprising instructions that when executed, cause a processor to perform a method for cloning an access point in a wireless communications network. The method includes receiving a service set identifier from an access point, transmitting an association request to the access point, transmitting an access point password to the access point, and transmitting the service set identifier in a beacon signal.

Another aspect disclosed is a method of cloning an access point in a wireless communications network. The method includes receiving an association request from a wireless node, receiving a node association password from the wireless node, comparing the node association password to an access point password, and accepting the association request from the wireless node based on the comparison.

Another aspect disclosed is an apparatus for cloning an access point in a wireless communications network. The apparatus includes a receiver, configured to receive a service set identifier from an access point, a transmitter, configured to transmit an association request to the access point, wherein the association request includes an access point password, and a transmitter, configured to broadcast the service set identifier in a beacon signal.

Another aspect disclosed is an apparatus for cloning an access point in a wireless communications network. The apparatus includes means for receiving a service set identifier from an access point, means for transmitting an association request to the access point, wherein the association request includes an access point password, and means for broadcasting the service set identifier in a beacon signal.

Another aspect disclosed is a non-transitory computer readable medium comprising instructions that when executed cause a processor to perform a method of receiving a service set identifier from an access point, transmitting an association request to the access point, wherein the association request includes an access point password, and broadcasting the service set identifier in a beacon signal.

Another aspect disclosed is a method of detecting whether an addressing format is supported by an access point on a wireless network. The method includes transmitting a request to an access point using an addressing format including a source address field and a separate transmitter address field, wherein the request includes the source address field set to a first address and the transmitter address field set to a second address, monitoring transmissions of the access point to determine whether the access point transmits a response to the request that includes a destination address equal to the first address, and determining whether the access point supports the addressing format based on the monitoring.

Another aspect disclosed is an apparatus for detecting whether an addressing format is supported by an access point on a wireless network. The apparatus a transmitter configured to transmit a request to an access point using an addressing format including a source address field and a separate transmitter address field, wherein the request includes the source address field set to a first address and the transmitter address field set to a second address, a receiver configured to monitor transmissions of the access point to determine whether the access point transmits a response to the request that includes a destination address equal to the first address, and a processor configured to determine whether the access point supports the addressing format based on the monitoring.

Another aspect disclosed is an apparatus for detecting whether an addressing format is supported by an access point on a wireless network. The apparatus includes means for transmitting a request to an access point using an addressing format including a source address field and a separate transmitter address field, wherein the request includes the source address field set to a first address and the transmitter address field set to a second address, means for monitoring transmissions of the access point to determine whether the access point transmits a response to the request that includes a destination address equal to the first address, and means for determining whether the access point supports the addressing format based on the monitoring.

Another aspect disclosed is a non-transitory computer readable medium comprising instructions that when executed cause a processor to perform the method of transmitting a request to an access point using an addressing format including a source address field and a separate transmitter address field, wherein the request includes the source address field set to a first address and the transmitter address field set to a second address, monitoring transmissions of the access point to determine whether the access point transmits a response to the request that includes a destination address equal to the first address, and determining whether the access point supports the addressing format based on the monitoring.

Another aspect disclosed is a method of providing relay services to a plurality of wireless nodes. The method includes receiving an association request from a first wireless node, transmitting a first association request to an access point, the association request including a first transmitter address, receiving an association request from a second wireless node different than the first wireless node, and transmitting a second association request to the access point, the association request including a second transmitter address different than the first transmitter address.

Another aspect disclosed is an apparatus for providing relay services to a plurality of wireless nodes. The apparatus includes a receiver configured to receive an association request from a first wireless node, a transmitter configured to transmit a first association request to an access point, the association request including a first transmitter address, a receiver configured to receive an association request from a second wireless node different than the first wireless node, and a transmitter configured to transmit a second association request to the access point, the association request including a second transmitter address different than the first transmitter address.

Another aspect disclosed is an apparatus for providing relay services to a plurality of wireless nodes. The apparatus includes means for receiving an association request from a first wireless node; means for transmitting a first association request to an access point, the association request including a first transmitter address; means for receiving an association request from a second wireless node different than the first wireless node; and means for transmitting a second association request to the access point, the association request including a second transmitter address different than the first transmitter address.

Another aspect disclosed is a non-transitory computer readable medium comprising instructions that when executed cause a processor to perform the method of receiving an association request from a first wireless node, transmitting a first association request to an access point, the association request including a first transmitter address, receiving an association request from a second wireless node different than the first wireless node, and transmitting a second association request to the access point, the association request including a second transmitter address different than the first transmitter address.

Another aspect disclosed is a method of associating a wireless node to a relay in a wireless communications system. The method includes generating a pool of access point associations, receiving an association request from a wireless node, searching the pool for an access point association; and transmitting a response to the association request based on the search.

Another aspect disclosed is an apparatus for associating a wireless node to a relay in a wireless communications system. The apparatus includes a processor configured to generate a pool of access point associations, a receiver configured to receive an association request from a wireless node, wherein the processor is further configured to search the pool for an access point association, and a transmitter configured to transmit a response to the association request based on the search.

Another aspect disclosed is an apparatus for associating a wireless node to a relay in a wireless communications system. The apparatus includes means for generating a pool of access point associations, means for receiving an association request from a wireless node, means for searching the pool for an access point association, and means for transmitting a response to the association request based on the search.

Another aspect disclosed is a non-transitory computer readable medium storing instructions that when executed cause a processor to perform a method of associating a wireless node to a relay in a wireless communications system. The method includes generating a pool of access point associations, receiving an association request from a wireless node, searching the pool for an access point association, and transmitting a response to the association request based on the search.

BRIEF DESCRIPTION OF THE DRAWINGS

FIG. 4A illustrates a wireless communications system 400 comprising an AP 104, a station 106, and a relay 105.

FIG. 4B illustrates a wireless communications system 450 comprising a relay 105b, a relay 105c, and a station 106.

DETAILED DESCRIPTION

Figure 1:
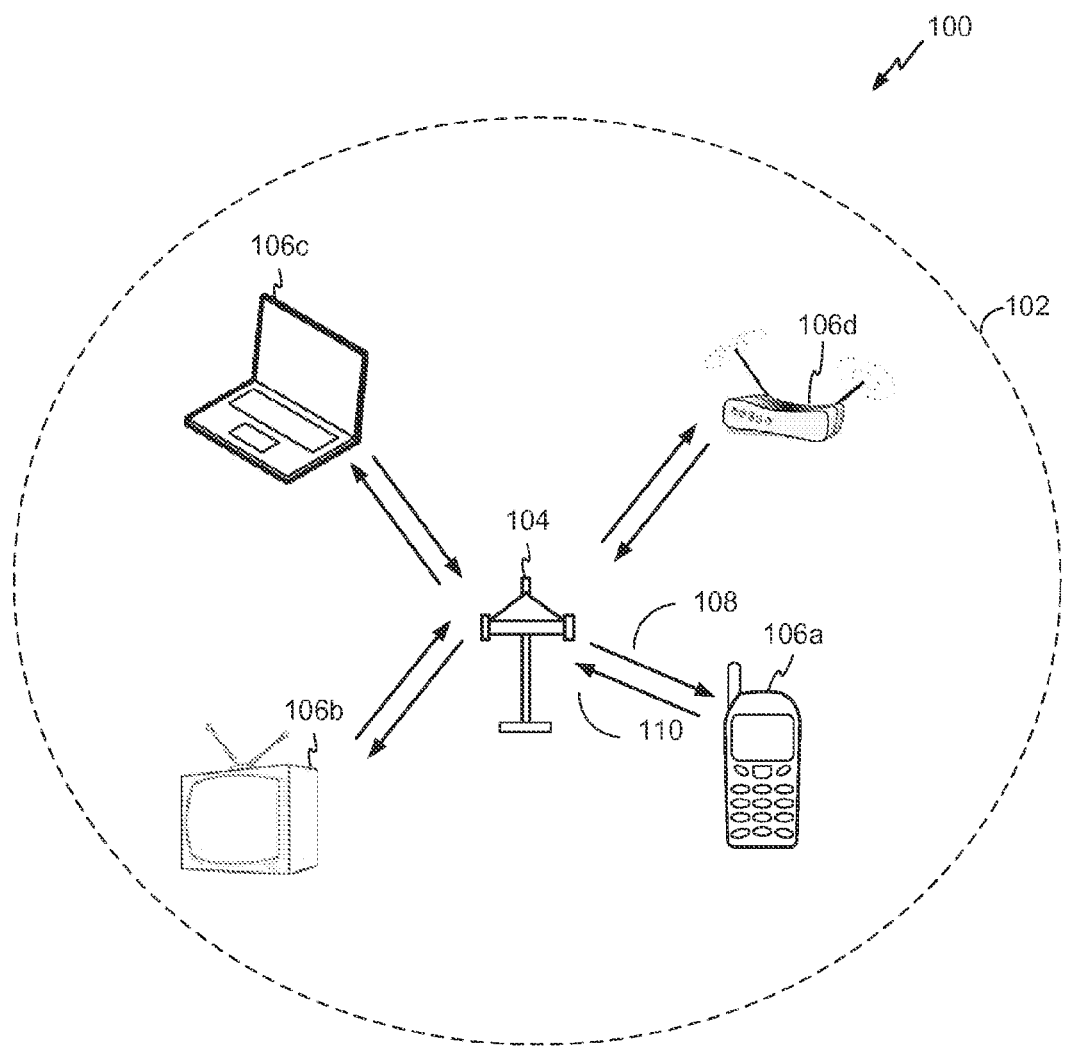
FIG. 1 shows an exemplary wireless communication system 100. The wireless communication system 100 may operate pursuant to a wireless standard, for example any one of the 802.11 standards.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals in a sub-gigahertz band may be transmitted according to the 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol such as 802.11) compliant wireless link to obtain general connectivity to the Internet or to other wide area networks. In some implementations a STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement any one of the 802.11 standards, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

The transmission range of wireless devices on a wireless network is of a limited distance. To accommodate the limited transmission range of devices communicating on a wireless network, access points may be positioned such that an access point is within the transmission range of the devices. In wireless networks that include devices separated by substantial geographic distance, multiple access points may be necessary to ensure all devices can communicate on the network. Including these multiple access points may add cost to the implementation of the wireless networks. Thus, a wireless network design that reduces the need for additional access points when the wireless network spans a distance that may exceed the transmission range of devices on the network may be desired.

A relay may be less expense than an access point. For example, some access point designs may include both wireless networking hardware and hardware necessary to interface with traditional wired LAN based technologies such as Ethernet. This additional complexity may cause access points to be more expensive than relays. Additionally, because the access points may interface with a wired LAN, the cost of installing multiple access points goes beyond the cost of the access point itself, and may include wiring costs associated with the wired LAN, and the labor and other installation costs associated with installing and configuring a wired LAN. Use of a relay instead of an access point may reduce some of the costs associated with an access point. For example, because a relay may use only wireless networking technologies, the design of the relay may provide for reduced cost when compared to access point designs. Additionally, the ability to relay wireless traffic may reduce the need for wired LAN cabling and installation expenses associated with access points.

FIG. 1 shows an exemplary wireless communication system 100. The wireless communication system 100 may operate pursuant to a wireless standard, for example the 802.11 standards. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The AP 104 may transmit a beacon signal (or simply a "beacon"), via a communication link such as the downlink 108, to other nodes STAs 106 of the system 100, which may help the other nodes STAs 106 to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information both common (e.g. shared) amongst several devices, and information specific to a given device.

In some aspects, a STA 106 may be required to associate with the AP 104 in order to send communications to and/or receive communications from the AP 104. In one aspect, information for associating is included in a beacon broadcast by the AP 104. To receive such a beacon, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

Figure 2A:
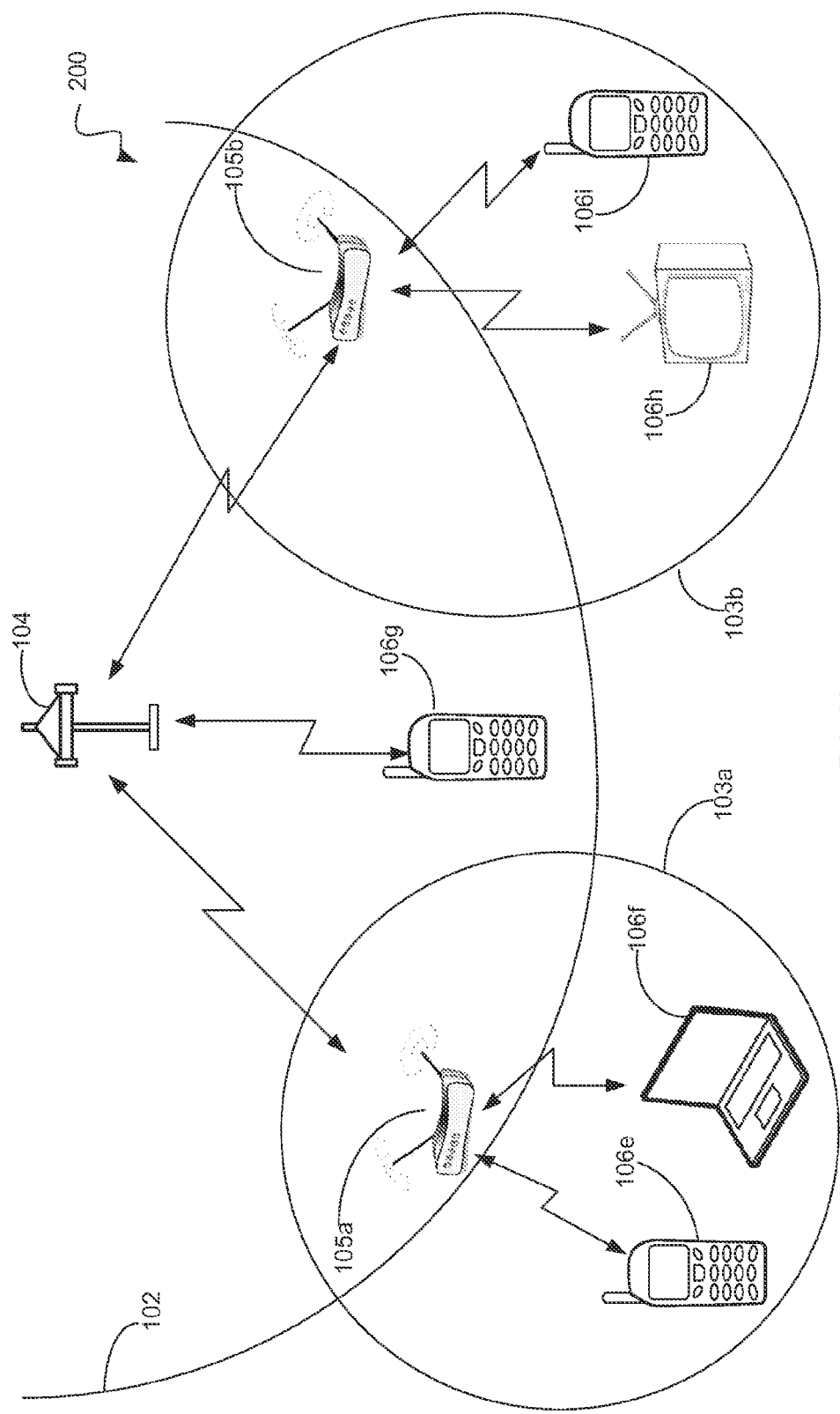
FIG. 2A shows another exemplary wireless communication system 200 in which aspects of the present disclosure may be employed.

FIG. 2A shows another exemplary wireless communication system 200 in which aspects of the present disclosure may be employed. The wireless communication system 200 may also operate pursuant to a wireless standard, for example any one of the 802.11 standards. The wireless communication system 200 may include an AP 104, which communicates with relays 105a-b and some STAs 106. The relays 105a-b may also communicate with some STAs 106.

As in FIG. 1, the wireless communication system 200 may function in accordance with OFDM/OFDMA techniques or CDMA techniques.

The AP 104 may act as a base station and provide wireless communication coverage in a basic service area (BSA) 102. In an embodiment, some STAs 106 may be located within the AP's BSA 102 while other STAs may be located outside the AP's BSA 102. For example, as illustrated in FIG. 2A, STA 106g may be located within the AP 104's BSA 102. As such, STA 106g may associate with AP 104 and perform wireless communications directly with AP 104. Other STAs, for example, STAs 106e-f and 106h-i may be outside the BSA 102 of the AP 104. Relays 105a-b may be inside the BSA 102 of the AP 104. As such, relays 105a-b may be able to associate with the AP 104 and perform wireless communications directly with the AP 104.

The AP 104 may transmit a beacon signal (or simply a "beacon"), via a communication link such as the downlink 108, to other nodes STAs 106 of the system 200, which may help STA 106g or relays 105a-b to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information both common (e.g. shared) amongst several devices, and information specific to a given device.

In some aspects, the STA 106g or relays 105a-b may be required to associate with the AP 104 in order to send communications to and/or receive communications from the AP 104. In one aspect, information for associating is included in a beacon broadcast by the AP 104. To receive such a beacon, the STA 106g or the relays 105a-b may, for example, perform a broad coverage search over a coverage region. A search may also be performed by the STA 106 or relays 105a-b by sweeping a coverage region in a lighthouse fashion, for example. After receiving the information for associating, the STA 106g or relays 105a-b may transmit a reference signal, such as an association probe or request, to the AP 104. In some aspects, the AP 104 may use backhaul services, for example, to communicate with a larger network, such as the Internet or a public switched telephone network (PSTN).

The AP 104 along with the STAs 106 or relays 105a-b associated with the AP 104 and that use the AP 104 for communication may be referred to as a basic service set (BSS). It should be noted that the wireless communication system 200 may not have a central AP 104, but rather may function as a peer-to-peer network between the STAs 106. Accordingly, the functions of the AP 104 described herein may alternatively be performed by one or more of the STAs 106 or relays 105a-b.

The relays 105a-b may also act as a base station and provide wireless communication coverage in a basic service area 103a and 103b respectively. In an embodiment, some STAs 106 may be located within the BSA of a relay 105a-b. For example, STA 106e and STA 106f are illustrated within the BSA 103a of relay 105a. STA 106h and STA 106i are illustrated within the BSA 103b of relay 105b. As such, STAs 106e-f may associate with relay 105a and perform wireless communications directly with relay 105a. Relay 105a may form an association with AP 104 and perform wireless communications with AP 104 on behalf of STA 106e-f. Similarly, STAs 106h-i may associate with relay 105b and perform wireless communications directly with relay 105b. Relay 105b may form an association with AP 104 and perform wireless communications with AP 104 on behalf of STA 106h-i.

In some aspects, the STAs 106e-f and STA 106h-i may be required to associate with relays 105a-b in order to send communications to and/or receive communications from the relays 105a-b. In one aspect, information for associating is included in a beacon broadcast by the relays 105a-b. The beacon signal may include the same service set identifier (SSID) as that used by an access point with which the relay has formed an association. To receive such a beacon, the STAs 106e-f and 106h-i may, for example, perform a broad coverage search over a coverage region. A search may also be performed by the STAs 106e-f and 106h-i by sweeping a coverage region in a lighthouse fashion, for example.

In an embodiment, after the relay has formed an association with an access point and provided a beacon signal, one or more stations may then form an association with the relay. After receiving the information for associating, the STAs 106e-f and 106h-i may transmit a reference signal, such as an association probe or request, to the relays 105a-b. The relays may then accept the association request and send an association reply to the STAs. The stations may then send and receive data with the relay. The relay may forward data received from the one or more stations to an access point with which it has also formed an association. Similarly, when the relay receives data from the access point, the relay may forward the data received from the access point to an appropriate station. By performing relay services between a station and an access point, a station may effectively communicate with an access point, despite being unable to directly communicate with the access point.

Figure 2B:
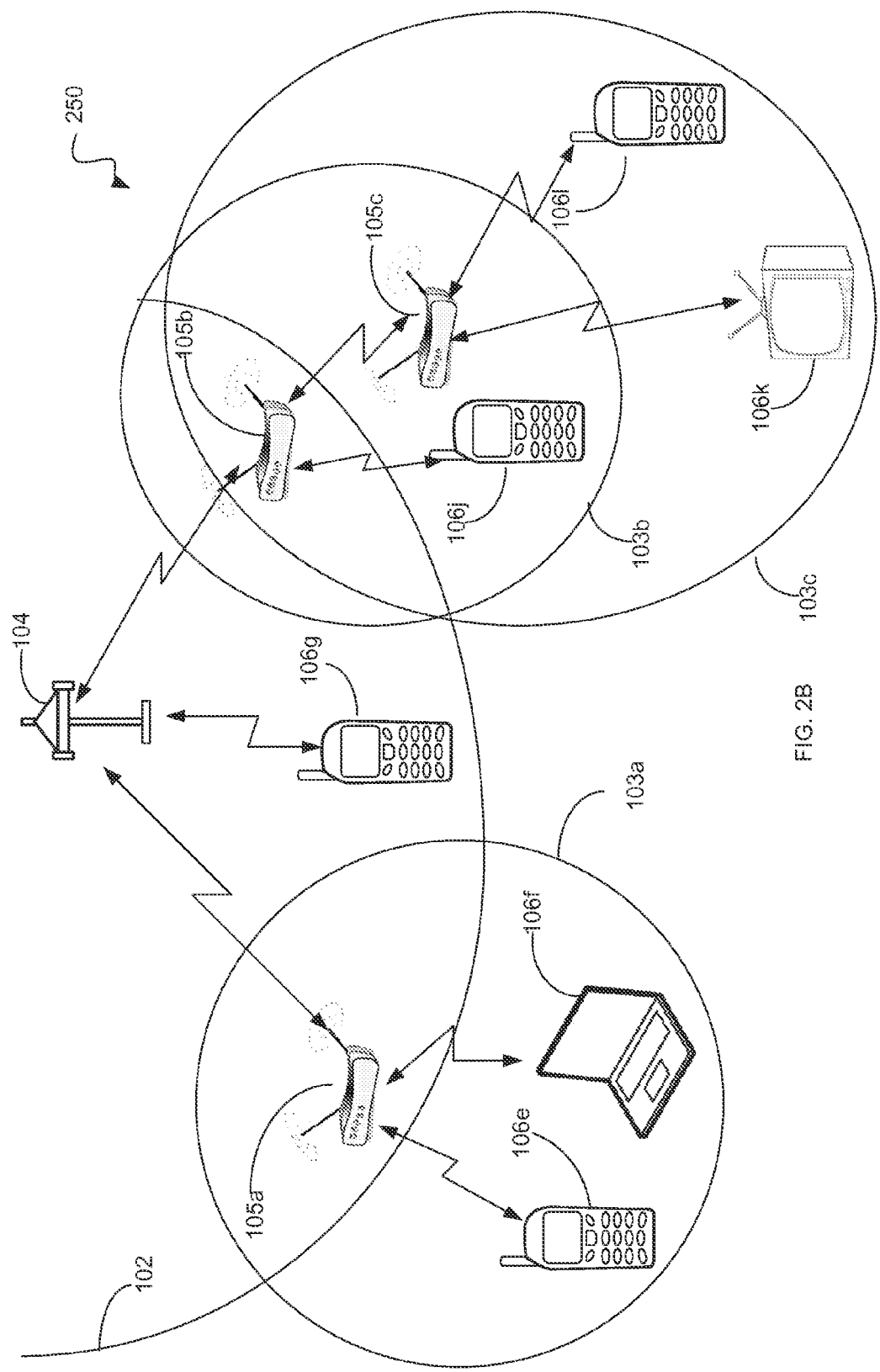
FIG. 2B shows another exemplary wireless communication system 250 in which aspects of the present disclosure may be employed.

FIG. 2B shows another exemplary wireless communication system 250 in which aspects of the present disclosure may be employed. The wireless communication system 250 may also operate pursuant to a wireless standard, for example any one of the 802.11 standards. Similar to FIG. 2A, the wireless communication system 250 may include an AP 104, which communicates with wireless nodes including relays 105a-b and STAs 106. The relays 105a-b may also communicate with wireless nodes such as some STAs 106. FIG. 2B differs from FIG. 2A in that the relays 105a-b may also communicate with wireless nodes that are other relays, such as relay 105c. As shown, relay 105b is in communication with relay 105c. Relay 105c may also communicate with some STAs 106. As in FIGS. 1 and 2A, the wireless communication system 250 may function in accordance with OFDM/OFDMA techniques or CDMA techniques.

As in FIG. 2A, the AP 104 and relays a-b may act as a base station and provide wireless communication coverage in a basic service area (BSA). Relay 105c may also act as a base station and provide wireless communication in a BSA. Each of AP 104 and relays a-c are shown with a basic service area 102 and 103a-c respectively. In an embodiment, some STAs 106 may be located within the AP's BSA 102 while other STAs may be located outside the AP's BSA 102. For example, similar to FIG. 2A, STA 106g may be located within the AP 104's BSA 102. As such, STA 106g may associate with AP 104 and perform wireless communications directly with AP 104. Other STAs, for example, STAs 106e-f and STAs 106j-l may be outside the BSA 102 of the AP 104. Relays 105*a-b* may be inside the BSA 102 of the AP 104. As such, relays 105*a-b* may be able to associate with the AP 104 and perform wireless communications directly with the AP 104.

Relay 105*c* may be outside the BSA 102 of the AP 104. Relay 105*c* may be within the BSA 103*b* of relay 105*b*. Therefore, relay 105*c* may associate with relay 105*b* and perform wireless communications with relay 105*b*. Relay 105*b* may then perform wireless communications with AP 104 on behalf of relay 105*c*. STAs 106*k-l* may associate with relay 105*c*. STAs 106*k-l* may then perform wireless communications via indirect communication with AP 104 and relay 105*b* via communication with relay 105*c*.

To communicate with relay 105*c*, STAs 106*k-l* may associate with relay 105*c* in a similar manner as STAs 106*e-f* associate with relay 105*a* as described above. Similarly, relay 105*c* may associate with relay 105*b* in a similar manner as relay 105*b* associates with AP 104. Therefore, the wireless communication system 250 provides a multi-tiered topology of relays extending out from AP 104 to provide wireless communications services beyond the BSA of AP 104. STAs 106 may communicate within the wireless communication system 250 at any level of the multi-tiered topology. For example, as shown, STAs may communicate directly with the AP 104, as shown by STA 106*g*. STAs may also communicate at a "first tier" of relays, for example, as shown by STAs 106*e-f* and 106*j* which communicate with relays 105*a-b* respectively. STAs may also communicate at a second tier of relays, as shown by STAs 106*k-l*, which communicate with relay 105*c*.

Figure 3:
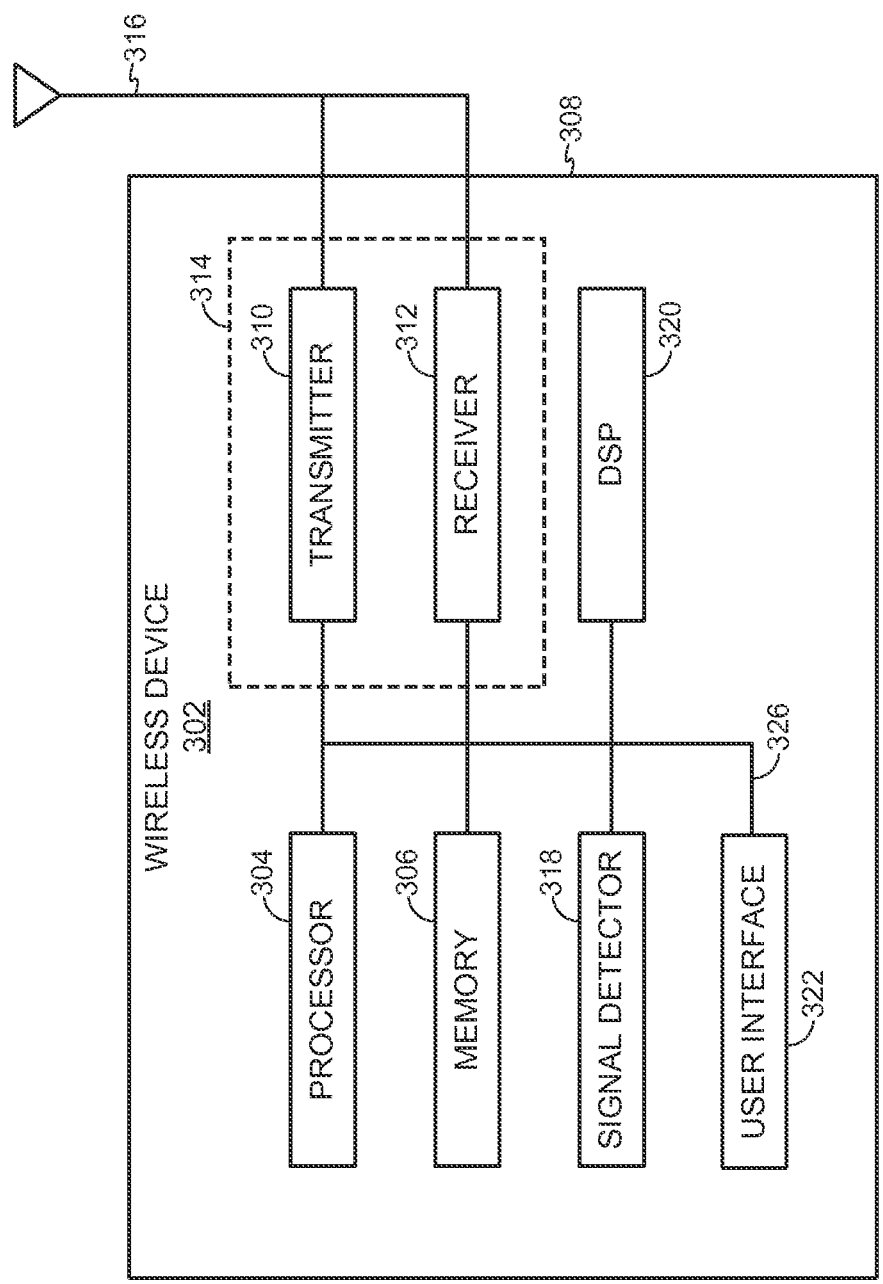
FIG. 3 shows an exemplary functional block diagram of a wireless device 302 that may be employed within the wireless communication system 100 of FIG. 1, 200 of FIG. 2A, or 250 of FIG. 2B.

FIG. 3 shows an exemplary functional block diagram of a wireless device 302 that may be employed within the wireless communication system 100 of FIG. 1 or 200 of FIG. 2A, or 250 of FIG. 2B. The wireless device 302 is an example of a device that may be configured to implement the various methods described herein. For example, the wireless device 302 may comprise the AP 104, one of the STAs 106, or one of the relays 320 and/or 330.

The wireless device 302 may include a processor 304 which controls operation of the wireless device 302. The processor 304 may also be referred to as a central processing unit (CPU). Memory 306, which may include both read-only memory (ROM) and random access memory (RAM), may provide instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 302 may also include a housing 308 that may include a transmitter 310 and/or a receiver 312 to allow transmission and reception of data between the wireless device 302 and a remote location. The transmitter 310 and receiver 312 may be combined into a transceiver 314. An antenna 316 may be attached to the housing 308 and electrically coupled to the transceiver 314. The wireless device 302 may also include (not shown) multiple transmitters, multiple receivers, multiple transceivers, and/or multiple antennas.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals. The DSP 320 may be configured to generate a packet for transmission. In some aspects, the packet may comprise a physical layer data unit (PPDU).

The wireless device 302 may further comprise a user interface 322 in some aspects. The user interface 322 may comprise a keypad, a microphone, a speaker, and/or a display. The user interface 322 may include any element or component that conveys information to a user of the wireless device 302 and/or receives input from the user.

The various components of the wireless device 302 may be coupled together by a bus system 326. The bus system 326 may include a data bus, for example, as well as a power bus, a control signal bus, and a status signal bus in addition to the data bus. Those of skill in the art will appreciate the components of the wireless device 302 may be coupled together or accept or provide inputs to each other using some other mechanism.

Although a number of separate components are illustrated in FIG. 3, those of skill in the art will recognize that one or more of the components may be combined or commonly implemented. For example, the processor 304 may be used to implement not only the functionality described above with respect to the processor 304, but also to implement the functionality described above with respect to the signal detector 318 and/or the DSP 320. Further, each of the components illustrated in FIG. 3 may be implemented using a plurality of separate elements.

The wireless device 302 may comprise an AP 104, a STA 106, or a relay 105, and may be used to transmit and/or receive communications. That is, either AP 104, STA 106, or relay 105, may serve as transmitter or receiver devices. Certain aspects contemplate signal detector 318 being used by software running on memory 306 and processor 304 to detect the presence of a transmitter or receiver.

FIG. 4A illustrates a wireless communications system 400 comprising an AP 104, a station (STA) 106, and a relay 105*b*. Note that while only one STA 106 and only one relay 105*b* are illustrated, the wireless communications system 400 may comprise any number of STAs and relays. In some embodiments, the access point 104 may be outside the transmission range of the station 106. In some embodiments, the station 106 may also be outside the transmission range of the access point 104. In these embodiments, the AP 104 and the STA 106 may be able to communicate with the relay 105, which may be within the transmission range of both the AP 104 and station 106. In some embodiments, both the AP 104 and station 106 may be within the transmission range of the relay 105*b*.

In some disclosed implementations, the relay 105*b* may communicate with the AP 104 in the same manner as a station would communicate with the AP. In some aspects, the relay may implement a "Wi-Fi Direct" point to point group owner capability or a SoftAP capability. In some aspects, a relay 105*b* may associate with the AP 104 in order to send communications to and/or receive communications from the AP 104. In one aspect, information for associating is included in a beacon signal broadcast by the AP 104. To receive such a beacon, the relay 105*b* may, for example, perform a broad coverage search over a coverage region. A search may also be performed by the relay 105 by sweeping a coverage region in a lighthouse fashion, for example. After receiving the information for associating, the relay 105*b* may transmit a reference signal, such as an association probe or request, to the AP 104. In an embodiment, the relay 105*b* may utilize a first station address when exchanging network messages with the AP 104.

Similarly, the STA 106 may associate with the relay 105*b* as if it were an AP. In some aspects, the STA 106 may associate with the relay 105*b* in order to send communications to and/or receive communications from the relay 105. In one aspect, information for associating is included in a beacon broadcast by the relay 105. After receiving the information for associating, the STA 106 may transmit a reference signal, such as an association probe or request, to the relay 105*b*. In one embodiment, the relay 105*b* may utilize a second station address that is different than the first station address when exchanging network messages with one or more stations.

FIG. 4B illustrates a wireless communications system 450 comprising a relay 105*b*, a relay 105*c*, and a station (STA) 106. In some disclosed implementations, the relay 105*c* may communicate with the relay 105*b* in the same manner as a station would communicate with an AP. In some aspects, relay 105*c* may implement a "Wi-Fi Direct" point to point group owner capability or a SoftAP capability. In some aspects, a relay 105*c* may associate with the relay 105*b* in order to send communications to and/or receive communications from the relay 105*b*. In one aspect, information for associating is included in a beacon signal broadcast by the relay 105*b*. To receive such a beacon, the relay 105*c* may, for example, perform a broad coverage search over a coverage region. A search may also be performed by the relay 105*c* by sweeping a coverage region in a lighthouse fashion, for example. After receiving the information for associating, the relay 105*c* may transmit a reference signal, such as an association probe or request, to the relay 105*b*. In an embodiment, the relay 105*c* may utilize a first station address when exchanging network messages with the relay 105*b*.

Similarly, the STA 106 may associate with the relay 105*c* as if it were an AP. In some aspects, the STA 106 may associate with the relay 105*c* in order to send communications to and/or receive communications from the relay 105*c*. In one aspect, information for associating is included in a beacon broadcast by the relay 105*c*. After receiving the information for associating, the STA 106 may transmit a reference signal, such as an association probe or request, to the relay 105*c*. In one embodiment, the relay 105*c* may utilize a second station address that is different than the first station address when exchanging network messages with one or more stations.

Figure 5A:
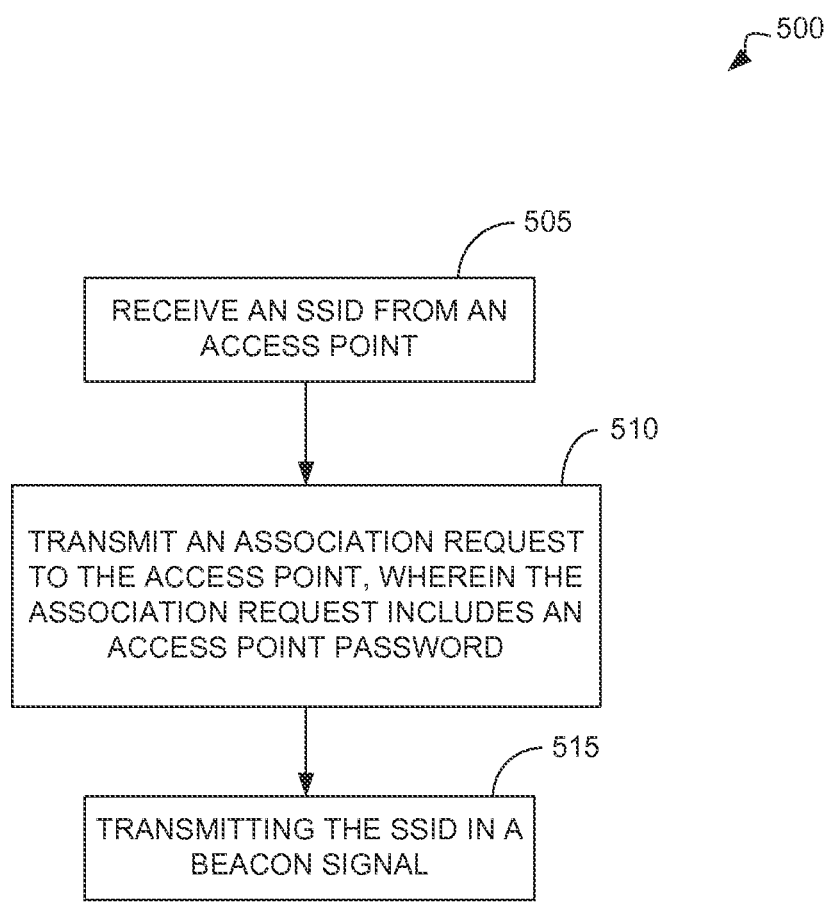
FIG. 5A is a flowchart of a process for cloning an access point in a wireless communication network

FIG. 5A is a flowchart of a process for cloning an access point in a wireless communication network. In an embodiment, process 500 may be performed by a relay, such as relay 105. In an embodiment, process 500 may illustrate a process for cloning a relay. In processing block 505, a relay receives a service set identifier from an access point. In some embodiments, the access point may be another relay that is cloning an access point. For example, the access point in process 500 may be relay 105*b* illustrated in FIG. 2B or FIG. 4B. In processing block 510, a relay transmits an association request to the access point. The association request may include an access point password. In an embodiment, the access point password may be pre-configured in a device performing process 500. In an embodiment, a first response to the association request transmitted to the access point may be received by a relay performing process 500 (not shown). The response may include an indication of whether the AP has accepted the association request. In an embodiment, a relay performing process 500 may also store association information from the response in an access point association data store.

In processing block 515, a relay performing process 500 transmits a beacon signal that includes the service set identifier received from the access point in processing block 505. In an embodiment the beacon signal is broadcast. In an embodiment, whether the beacon signal includes the service set identifier received from the access point may be conditional on whether the access point indicated that it accepted the association request in the first response. If the association request was accepted, the service set identifier may be included in the beacon signal. If the first response indicated that the association request was not accepted, the service set identifier may not be included in the beacon signal, or no beacon signal may be sent.

In an embodiment, a relay performing process 500 may use a first station address to communicate with the access point and a different second station address to transmit the service set identifier in a beacon signal. For example, the association request transmitted in block 510 may include a first transmitter address and the beacon signal transmitted in block 515 may include a different second transmitter address.

Once the relay running process 500 transmits the beacon signal, it may receive one or more association requests from one or more wireless nodes. These wireless nodes may include at least stations or relays. The relay may support communication with the one or more wireless nodes using at least one station address that is different than the station address the relay uses to communicate with an access point. When association with a wireless node is complete, the relay performing process 500 may store a MAC address of the wireless node in a node association data store. The node association data store may be used to determine which station a particular access point communication relates to.

The relay may also operate as a "Wi-Fi Direct" group owner when communicating with the stations. When operating as a "Wi-Fi Direct" group owner, the relay may allow associations from non Wi-Fi direct wireless nodes. The relay may also utilize a "Soft AP" protocol when communicating with the one or more wireless nodes. If all of the wireless nodes associated with a relay are supporting "Wi-Fi Direct", the relay may use a "power save" mode defined by "Wi-Fi Direct."

Figure 5B:
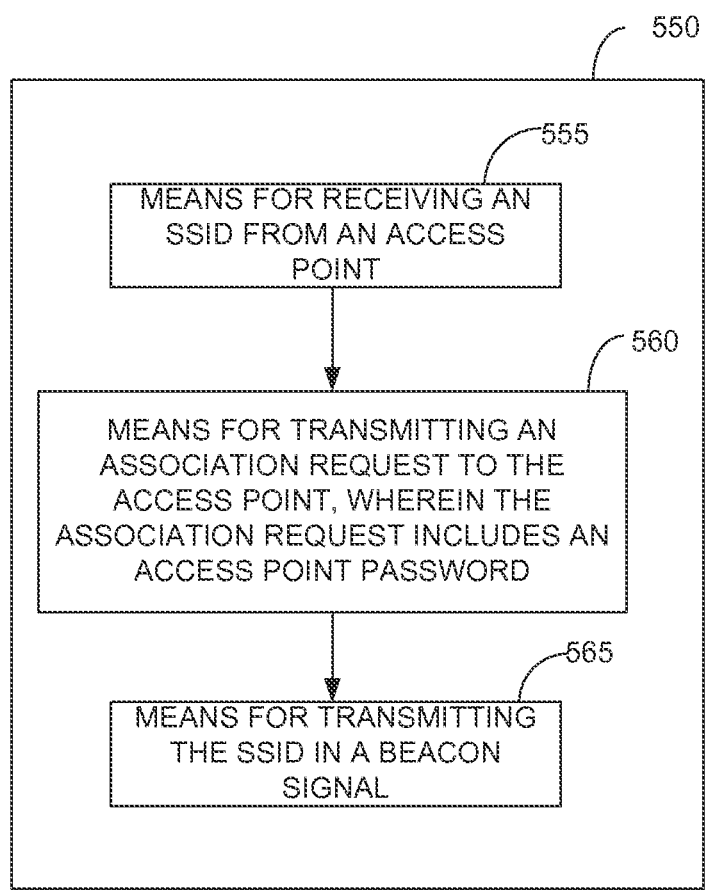
FIG. 5B is a functional block diagram of an exemplary device 550 that may be employed within the wireless communication system 100, 200, or 250.

FIG. 5B is a functional block diagram of an exemplary device 550 that may be employed within the wireless communication system 100 or 200. The device 550 includes means for receiving a service set identifier from an access point. In an embodiment, means 555 may be configured to perform one or more of the functions discussed above with respect to block 505. In an embodiment, the means for receiving a service set identifier from an access point may include a receiver, such as receiver 312 of FIG. 3. Means 555 may also include one or more of a processor, signal generator, transceiver, decoder, or a combination of hardware and/or software component(s), circuits, and/or module(s). The device 550 further includes means 560 for transmitting an association request to the access point, wherein the association request includes an access point password. In an embodiment, means 560 may be configured to perform one or more of the functions discussed above with respect to block 510. The means 560 for transmitting an association request to the access point may include a transmitter, such as transmitter 310 of FIG. 3. Means 560 may also include one or more of a processor, signal generator, transceiver, decoder, or a combination of hardware and/or software component(s), circuits, and/or module(s). The device 550 further includes means 565 for transmitting the service set identifier in a beacon signal. In an embodiment, means 565 may be configured to perform one or more of the functions discussed above with respect to block 515. In an embodiment, the means for transmitting the service set identifier in a beacon signal may include a transmitter, such as transmitter 310 of FIG. 3. Means 565 may also include one or more of a processor, signal generator, transceiver, decoder, or a combination of hardware and/or software component(s), circuits, and/or module(s).

Figure 6A:
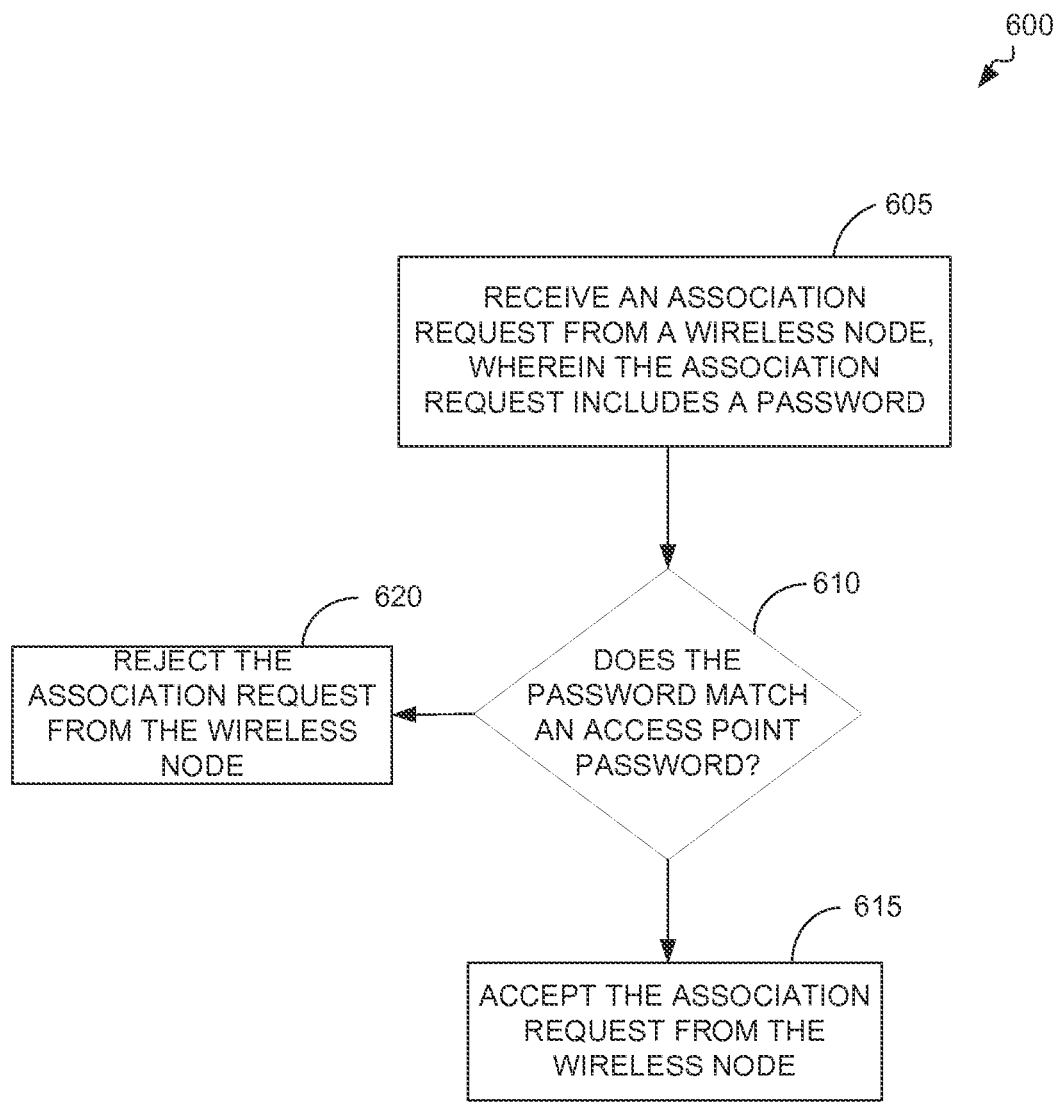
FIG. 6A is a flowchart of a process for establishing an association between a wireless node and a relay in the wireless communications system of FIGS. 1 and 2A-B.

FIG. 6A is a flowchart of a process for establishing an association between a wireless node and a relay in the wireless communications system of FIGS. 1 and 2A-B. In an embodiment, process 600 may be performed by a relay, for example, relays 105a-c of FIGS. 2A-B or FIGS. 4A-B. In an embodiment, a wireless node may be a station. In an embodiment, a wireless node may be relay. For example, relay 105c illustrated in FIG. 2B may be considered a wireless node. In processing block 605, an association request is received from a wireless node. The association request includes a password. In decision block 610, the password in the association request is compared to an access point password. In an embodiment, the access point password may be a password used to form an association between the relay performing process 600 and an access point. For example, a relay running process 600 may have previous to performing process 600, formed an association with an access point using the access point password. In an embodiment, the relay running process 600 may have performed process 500 prior to performing process 600. In an embodiment, the access point password may be a relay password.

If decision block 610 determines that the password received in the association request does not match the access point password, the association request from the wireless node is rejected in block 620. Rejecting the association request may include transmitting an association response message over a wireless network to the wireless node, including an indication that the association request is rejected. The response may also indicate that the password provided in the association request was not accepted.

If the password specified in the association request from the wireless node does match the access point password, a relay running process 600 accepts the association request from the wireless node in block 615. Accepting the association request from the wireless node may include sending an association response message over a wireless network including an indication that the association request was accepted. When a relay running process 600 accepts an association request from a wireless node, the relay may store information identifying the wireless node in a node association data store. For example, the relay may maintain a data store that records all of the nodes for which the relay is currently associated. This data store may be consulted when performing relay services for the associated nodes.

In an embodiment, before the relay running process 600 accepts the association request from a node, the relay may initiate an association with an access point. The access point may use the access point password referenced in decision block 610 to permit or deny associations. In an embodiment, the association with the access point may be on behalf of the node. In an embodiment, the relay may utilize a unique station address for access point communications performed on behalf or in response to communications with a particular node. In other words, there may be a one to one mapping between nodes associated with or in communication with a relay, and station addresses used by the relay when communicating with an access point.

When the access point responds to an association request from the relay including a transmitter address, the response may include a receiver or destination address equivalent to the transmitter address used in the request. Based on the receiver or destination address in the response, the relay may determine which node the response from the access point corresponds to.

Figure 6B:
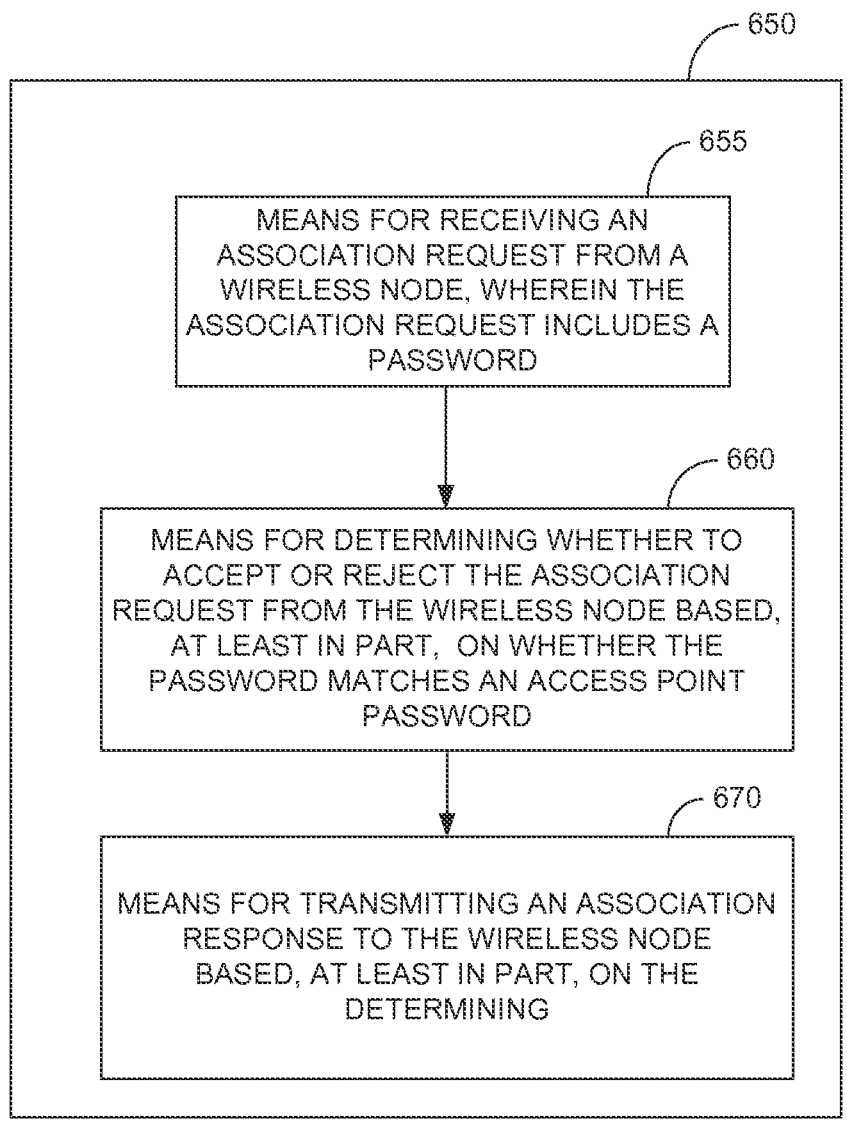
FIG. 6B is a functional block diagram of an exemplary device 650 that may be employed within the wireless communication system 100, 200, or 250.

FIG. 6B is a functional block diagram of an exemplary device 650 that may be employed within the wireless communication system 100 or 200. The device 650 includes means 655 for receiving an association request from a wireless node, wherein the association request includes a password. In an embodiment, means 655 may be configured to perform one or more of the functions discussed above with respect to block 605. The means 655 for receiving an association request may include a receiver, such as receiver 312 of FIG. 3. Means 655 may also include one or more of a processor, signal generator, transceiver, decoder, or a combination of hardware and/or software component(s), circuits, and/or module(s). The device 650 further includes means 660 for determining whether to accept or reject the association request from the node based, at least in part, on whether the password matches an access point password. In an embodiment, means 660 may be configured to perform one or more of the functions discussed above with respect to blocks 610. In an embodiment, the means for determining whether to accept or reject the association request may include a processor, such as processor 304 of FIG. 3. Means 660 may also include one or more of a processor, signal generator, transceiver, decoder, or a combination of hardware and/or software component(s), circuits, and/or module(s). The device 650 further includes means 670 for transmitting an association response to the node based, at least in part, on the determining. In an embodiment, means 670 may be configured to perform one or more of the functions discussed above with respect to blocks 615 and 620. The means 670 for transmitting an association response may include a transmitter, such as transmitter 310 of FIG. 3. Means 670 may also include one or more of a processor, signal generator, transceiver, decoder, or a combination of hardware and/or software component(s), circuits, and/or module(s).

Figure 7A:
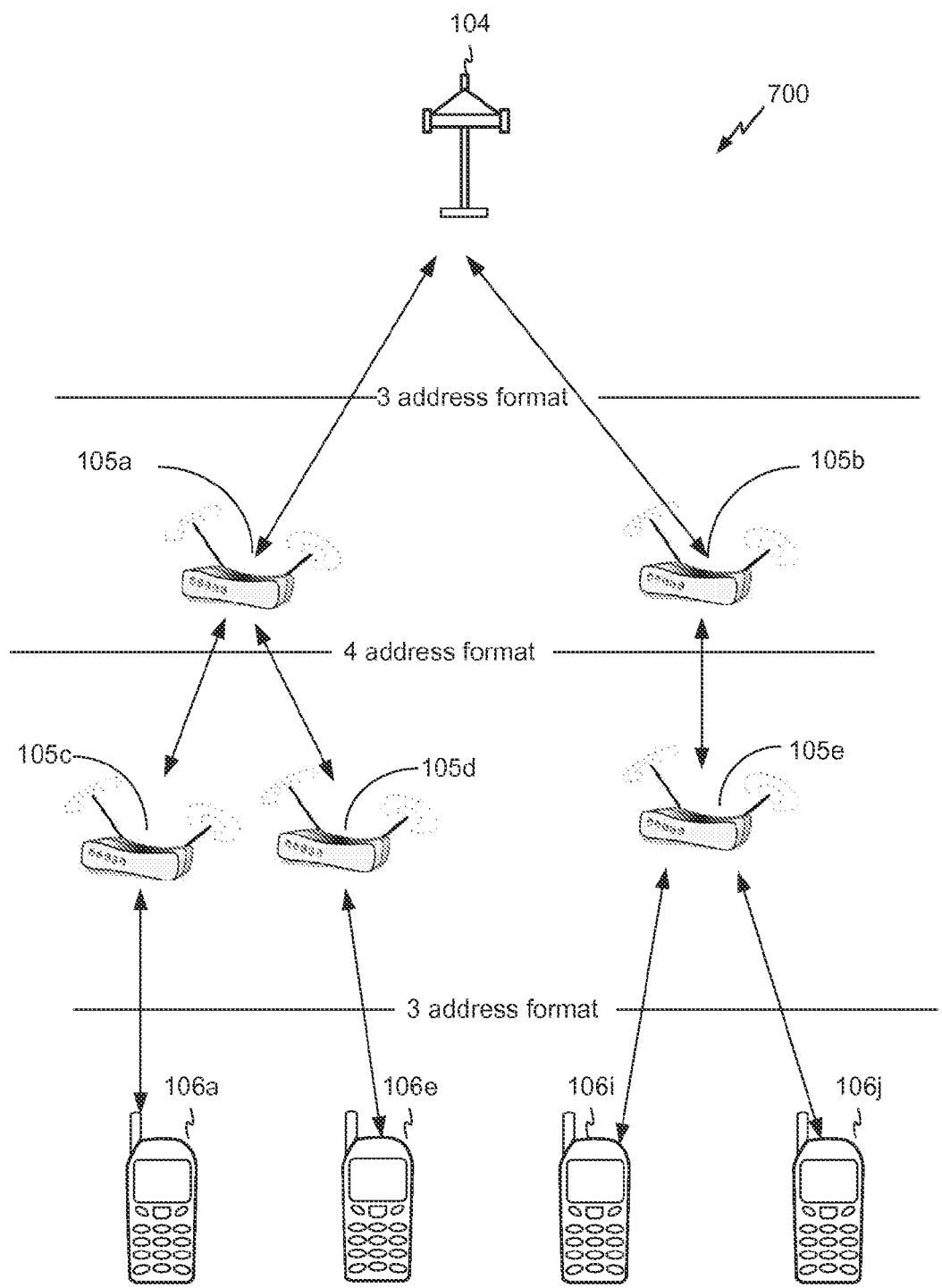
FIG. 7A shows another exemplary wireless communication system 700 in which aspects of the present disclosure may be employed.

FIG. 7A shows another exemplary wireless communication system 700 in which aspects of the present disclosure may be employed. The communication system 700 includes an access point 104, two relays 105a-b that communicate directly with the AP 104, three relays 105c-e that communicate with the AP 104 via relays 105*a-b*, and four stations 106*a*, 106*e*,106*i*, and 106*j*, which communicate with the AP 104 via a path including two of the previously identified relays 105*a-e*. In the illustrated communication system 700, the AP 104 utilizes a three address format for communication. In this three address format, messages transmitted by the AP 104 to wireless nodes with which the AP 104 is communication include a receiver address, transmitter address and source address. Messages transmitted by the AP 104 do not include a destination address. While the AP 104 may receive messages utilizing a four address format that includes a destination address, the AP 104 will not interpret or utilize a destination address if specified in a message it receives.

In the illustrated communication system 700, messages exchanged between relays 105*a-b* and relays 105*c-e* use a four address format that includes a source and destination address, as well as a receiver and transmitter address. Messages exchanged between relays 105*c-e* and STAs 106*a*, 106*e*, 106*i*, and 106*j* utilize the three address format discussed above.

The use of the three address format messages for communication in the communication system 700 presents some challenges. For example, when relay 105*a* transmits and receives messages with the AP 104 on behalf of either relay 105*c-d*, the relay 105*a* is unable to route messages received from the AP 104 to either relay 105*c* or 105*d* based on a destination address included in the received message, since the three address format used by AP 104 does not support a destination address field. Therefore, the relay 105*a* must utilize an alternative method of routing messages received from AP 104 to either relay 105*c* or relay 105*d*.

Figure 7B:
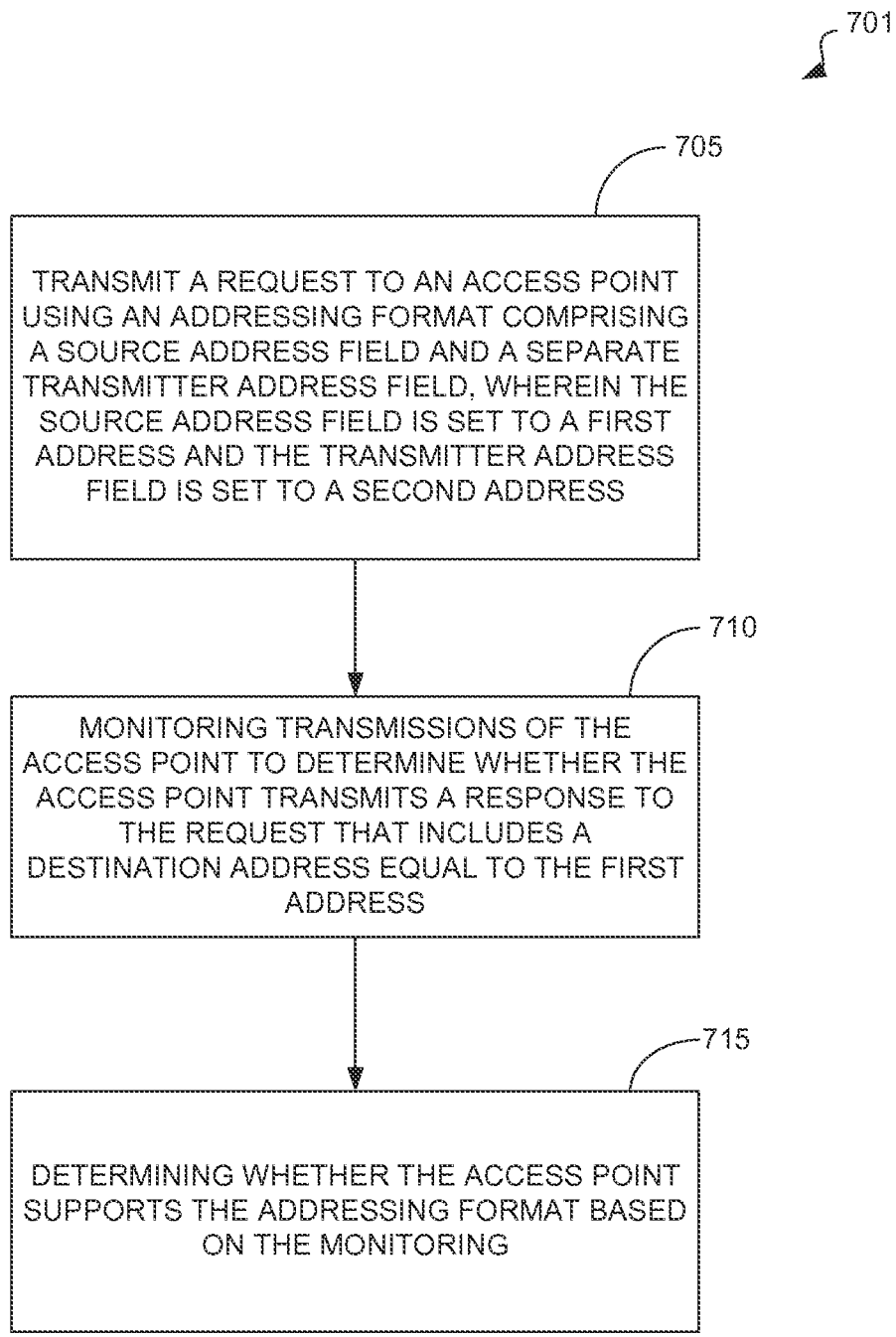
FIG. 7B is a flowchart of a process for detecting whether an addressing format is supported by a network node on a wireless communication system.

FIG. 7B is a flowchart of a process for detecting whether an addressing format is supported by an access point in a wireless communication system. In an embodiment, the access point may be a relay, such as relay 105*b* illustrated in FIG. 2B. In an embodiment, process 700 may be performed by a relay 105 or by a STA 106. Detection of the addressing format used by an access point may determine methods of communication with the access point. For example, if an access point supports an address format that provides for separate transmitter and source addresses, or separate receiver and destination addresses, a relay or station in communication with the access point may rely on the separate addresses when communicating with an access point. In contrast, an access point may not support an addressing format that provides for separate transmitter and source addresses, or receiver and destination addresses. In this case, a relay running process 700 may provide alternative communication methods for providing relay services between an access point and a station. For example, in some embodiments, the relay may utilize IP protocol based communications for communication between a wireless node and an access point. Alternatively, a relay may utilize methods and devices discussed in FIGS. 8A-B if the access point does not support the addressing format providing for separate transmitter and source addresses, or receiver and destination addresses.

In block 705, a request is transmitted to an access point. In an embodiment, the request may be an ICMP Ping message. In another embodiment, the request may be an Address Resolution Protocol (ARP) message for a gateway IP address, or an IP address of a relay. In some aspects, the request may typically result in the generation of a response message from a node receiving the request.

The request message uses an addressing format that includes a source address field and a separate transmitter address field. The request has the source address field set to a first address and the transmitter address field set to a second address. In an embodiment, the first address is different than the second address. In an embodiment, the first address may be set to an address that does not identify any node on the wireless network. In an embodiment, the first address may be set to a locally administered address. For example, in an embodiment, the U/L bit of the locally administered address may have a value of one (1). In an embodiment, the U/L bit may be the second least significant bit of the most significant byte of the address. In an embodiment, the second address may identify the address of a relay performing process 700.

In an embodiment, the request transmitted in block 705 may be a ping request. In an embodiment, the address format is an 802.11 frame format including four addresses. The address format may include a transmitter address, a receiver address, a source address and a destination address.

In an embodiment, the transmitter address field may indicate the node transmitting a message on a network. In an embodiment, the transmitter address may be set to the address of a relay. The source address field may indicate an original sending node of the request or the address of the node that initially generated the request.

In block 710, transmissions of the access point are monitored to determine whether the node transmits a response to the request that includes a destination address equal to the first address. Note that the source address field of the request was set to the first address. In an embodiment, block 710 monitors whether the access point transmits a response to the request to the source address (the non-existent node's address in an embodiment) or the transmitter address (the relay's address in an embodiment). In block 715, whether the node supports the addressing format is determined based on the monitoring. If the access point transmits a response to the first address, it may indicate that the access point was able to interpret the addressing format sufficiently to identify the distinct first and second addresses sent in the request in block 705. In this case, it may be determined that the access point supports the address format. If the access point transmits a response to the second address, it may indicate the access point does not know how to interpret the addressing format, such that the access point sent the response to the request using the transmitter address field in the request (the response was sent to the relay instead of the non-existent node in an embodiment). In this case, it may be determined that the access point does not support the addressing format.

Recall that in an embodiment, the first address may be an address that does not identify any node or device on the wireless network. In an embodiment, the first address may be a locally administered address. Once it is determined whether the access point supports the address format, additional packets or data may be transmitted to the access point, based, at least in part, on whether the access point supports the address format or not. For example, if it is determined the access point does support the address format, additional network applications may be enabled. If the access point does not support the address format, other methods of communicating with the access point that do not use the address format may be used. For example, communication with the access point may use methods or devices described below in FIGS. 8A and 8B.

Figure 7C:
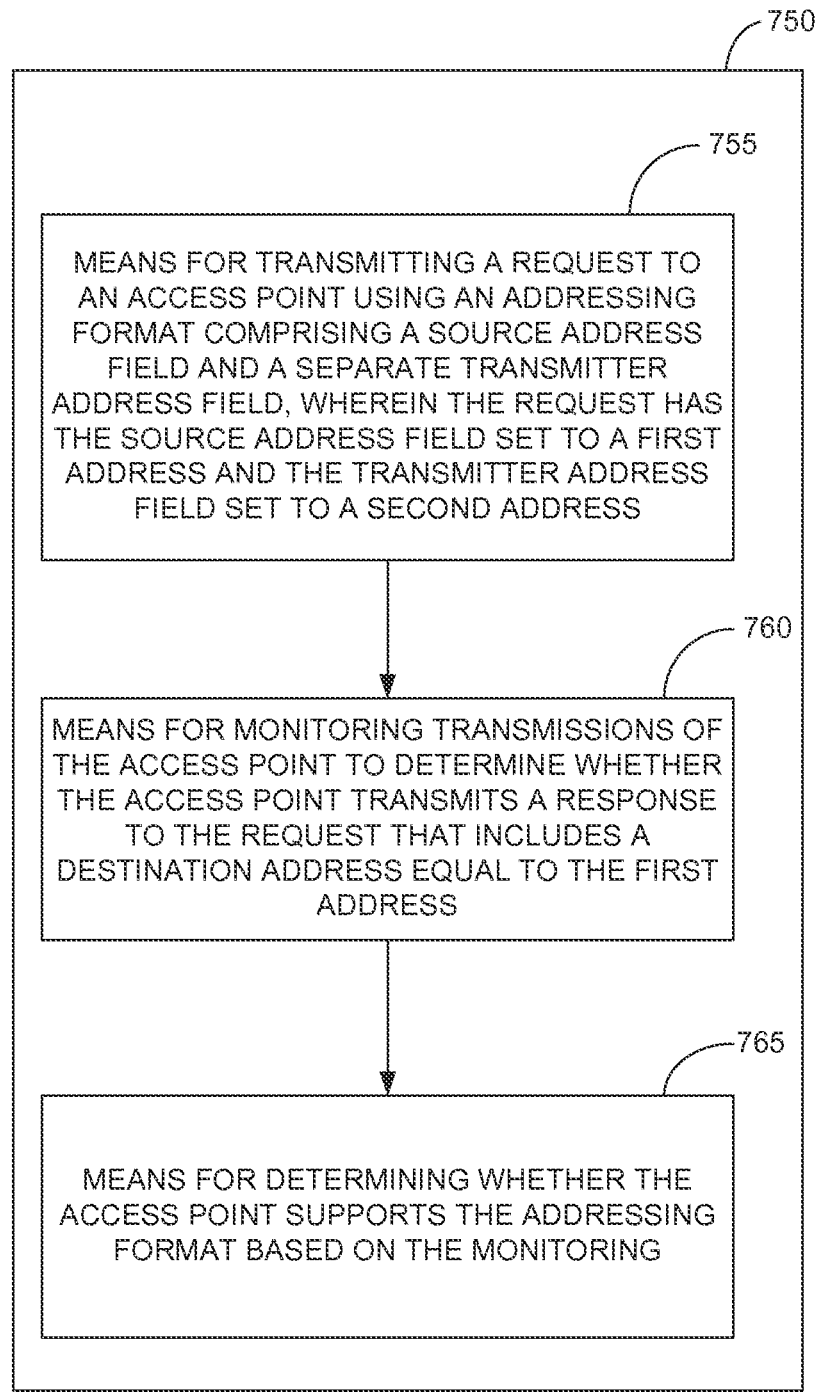
FIG. 7C is a functional block diagram of an exemplary device 750 that may be employed within the wireless communication system 100, 200, or 250.

FIG. 7C is a functional block diagram of an exemplary device 750 that may be employed within the wireless communication system 100 or 200. The device 750 includes means 755 for transmitting a request to an access point using an addressing format comprising a source address field and a separate transmitter address field, wherein the request has the source address field set to a first address and the transmitter address field set to a second address. In an embodiment, the access point may be a relay, such as relay 105c illustrated in FIG. 2B. In an embodiment, means 755 may be configured to perform one or more of the functions discussed above with respect to block 705. In an embodiment, the means for transmitting a request to an access point using an addressing format may include a transmitter, such as transmitter 310 of FIG. 3. Means 755 may also include one or more of a processor, signal generator, transceiver, decoder, or a combination of hardware and/or software component(s), circuits, and/or module(s). The device 750 further includes means 760 for monitoring transmissions of the access point to determine whether the access point transmits a response to the request that includes a destination address equal to the first address. In an embodiment, means 760 may be configured to perform one or more of the functions discussed above with respect to block 710. The means 760 for monitoring transmissions of the access point may include a receiver, such as receiver 312 of FIG. 3. Means 760 may also include one or more of a processor, signal generator, transceiver, decoder, or a combination of hardware and/or software component(s), circuits, and/or module(s). The device 750 further includes means 765 for determining whether the access point supports the addressing format based, at least in part, on the monitoring. In an embodiment, means 765 may be configured to perform one or more of the functions discussed above with respect to block 715. In an embodiment, the means for determining whether the access point supports the addressing format may include a processor, such as processor 304 of FIG. 3. Means 765 may also include one or more of a processor, signal generator, transceiver, decoder, or a combination of hardware and/or software component(s), circuits, and/or module(s).

Figure 8A:
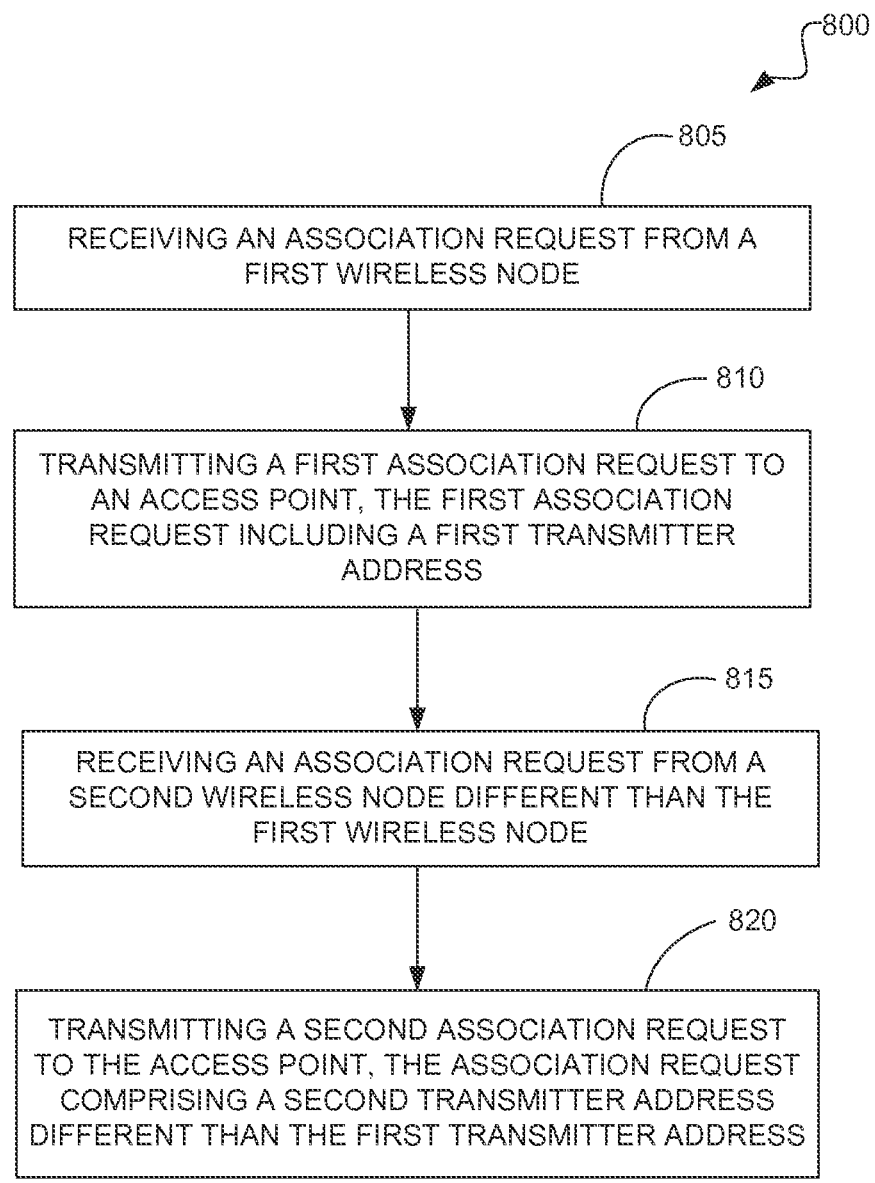
FIG. 8A is a flowchart of a process for associating a wireless node to a relay in the wireless communications system of FIG. 1, 2A, or 2B.

FIG. 8A is a flowchart of a process for associating a wireless node to a relay in the wireless communications system of FIGS. 1 and 2A-B. In an embodiment, process 800 may be performed by a relay, such as relay 105a-c illustrated in FIGS. 2A-B and FIG. 4. In processing block 805, an association request is received from a first wireless node. In an embodiment, a wireless node may be a station. In an embodiment, a wireless node may be a relay. In block 810, a first association request is transmitted to an access point. In an embodiment, an access point may be a relay, such as relays 105a-c of FIGS. 2A-B. The first association request includes a first transmitter address. In an embodiment, transmitting the first association request in block 810 may be in response to receiving an association request from a first station in block 805. In an embodiment, a relay performing process 800 may associate with an access point (or relay) on behalf of a wireless node. In an embodiment, a relay running process 800 may receive a first association response in response to transmitting the first association request. In an embodiment, the first association response may be transmitted to the first transmitter address, which in an embodiment indicates the address of the relay that transmitted the association request. For example, a receiver address or a destination address included in the first association response may be set to the first transmitter address. The association response may also include an indication of whether the access point has agreed to associate with the relay. In an embodiment, a relay may determine the first association response received from the access point corresponds to the association request received from the first wireless node. For example, the relay running process 800 may search a node association data store for the first transmitter address upon receiving the first association response. The node association data store may include a mapping from receiver addresses to node identifying information. For example, it may map from a receiver or destination address to a station address. In an embodiment, the relay running process 800 may send an association response to the first wireless node based on the mapping determined from the node association data store. The association response sent to the first wireless node may include an indication of whether the relay agrees to associate with the first wireless node. In an embodiment, the indication may be based on the indication included in the first association response received from the access point.

In an embodiment, the access point does not support 802.11 four address format. In these embodiments, the access point may not specify a receiver address different than a destination address in network messages sent to the relay. Thus, by using a separate receiver address for every wireless node associated with the relay when exchanging network messages with an access point, the relay may map a message exchange with an access point (using for example, a receiver address specified in messages transmitted by the access point) to a message exchange with a particular node.

In processing block 815, an association request is received from a second wireless node. The second wireless node is different than the first wireless node. In block 820, a second association request is transmitted to the access point. The second association request comprises a second transmitter address different than the first transmitter address. In an embodiment, transmitting the second association request may be in response to receiving the association request from the second wireless node. In an embodiment, a relay performing process 800 may associate with the access point on behalf of the second wireless node. In response to transmitting the second association request, some embodiments may receive a second association response or reply from the access point. The second association reply from the access point may be transmitted to the second transmitter address. It may be transmitted to the second transmitter address by having a receiver address equivalent to the second transmitter address. In some embodiments, a relay performing process 600 may determine the second association reply corresponds to the association request received from the second wireless node based on the receiver address.

Figure 8B:
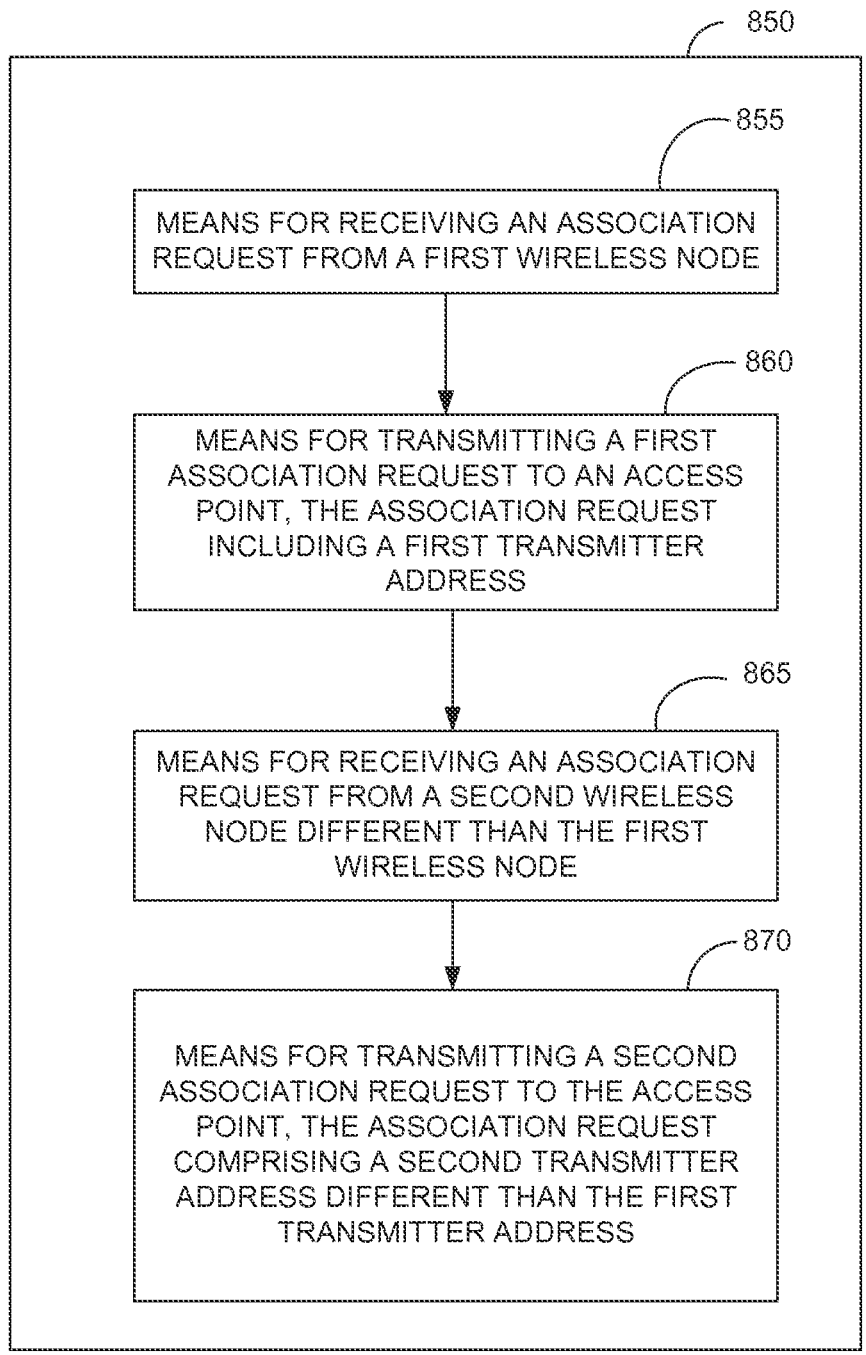
FIG. 8B is a functional block diagram of an exemplary device 850 that may be employed within the wireless communication system 100, 200, or 250.

FIG. 8B is a functional block diagram of an exemplary device 850 that may be employed within the wireless communication system 100 or 200. The device 850 includes means 855 for receiving an association request from a first wireless node. In an embodiment, means 855 may be configured to perform one or more of the functions discussed above with respect to block 805. In an embodiment, the means for receiving an association request from a first wireless node may include a receiver, such as receiver 312 of FIG. 3. Means 855 may also include one or more of a processor, signal generator, transceiver, decoder, or a combination of hardware and/or software component(s), circuits, and/or module(s). The device 850 further includes means 860 for transmitting a first association request to an access point, the association request including a first transmitter address. In an embodiment, means 860 may be configured to perform one or more of the functions discussed above with respect to block 810. The means 860 for transmitting a first association request may include a transmitter, such as transmitter 310 of FIG. 3. Means 860 may also include one or more of a processor, signal generator, transceiver, decoder, or a combination of hardware and/or software component(s), circuits, and/or module(s). The device 850 further includes means 865 for receiving an association request from a second wireless node different than the first wireless node. In an embodiment, means 865 may be configured to perform one or more of the functions discussed above with respect to block 815. In an embodiment, the means for receiving an association request from a second wireless node may include a receiver, such as receiver 312 of FIG. 3. Means 865 may also include one or more of a processor, signal generator, transceiver, decoder, or a combination of hardware and/or software component(s), circuits, and/or module(s). The device 850 further includes means 870 for transmitting a second association request to the access point, the association request comprising a second transmitter address different than the first transmitter address. In an embodiment, means 870 may be configured to perform one or more of the functions discussed above with respect to block 820. In an embodiment, the means for transmitting a second association request to the access point may include a transmitter, such as transmitter 310 of FIG. 3. Means 870 may also include one or more of a processor, signal generator, transceiver, decoder, or a combination of hardware and/or software component(s), circuits, and/or module(s).

Figure 8C:
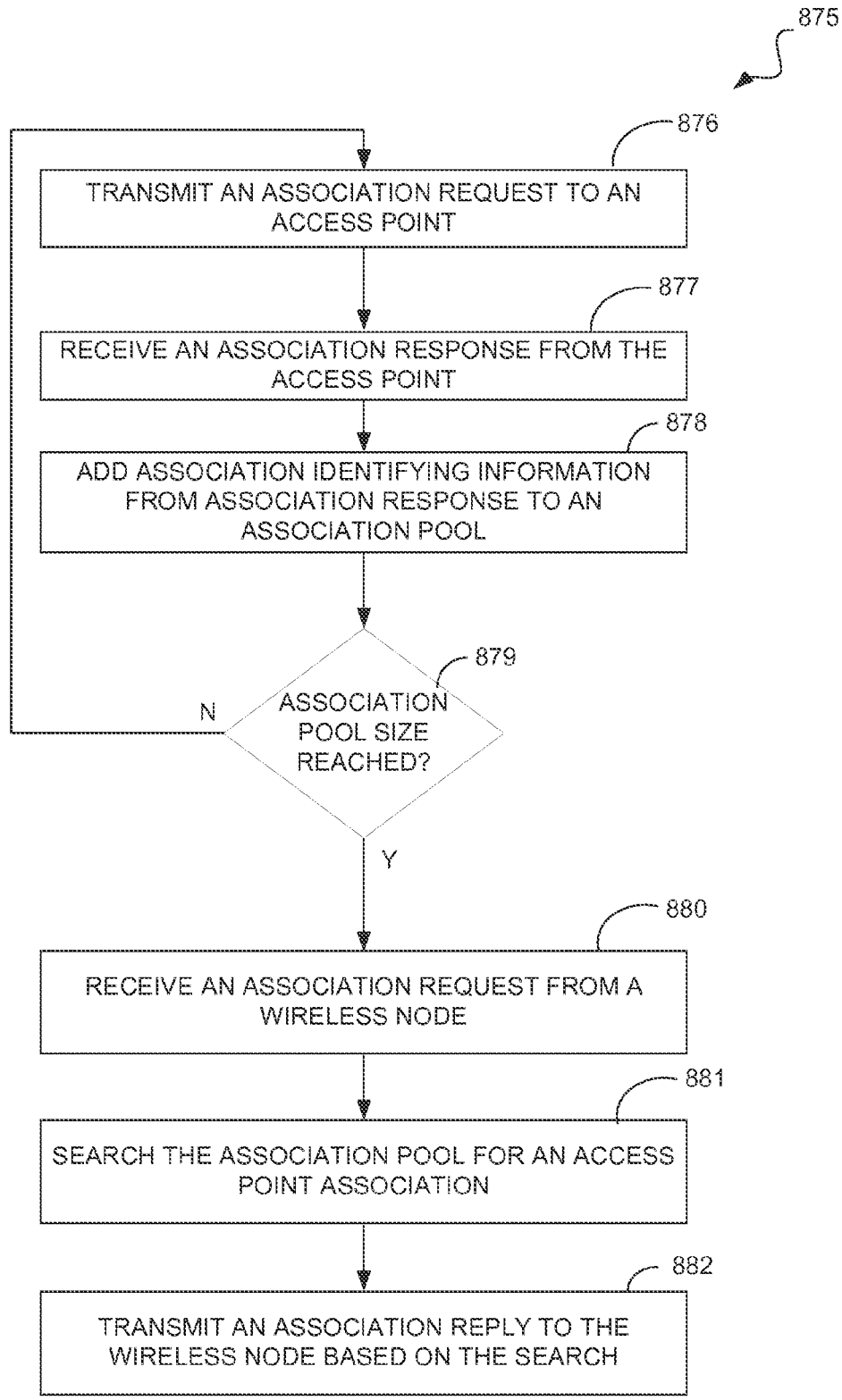
FIG. 8C is a flowchart of a process for associating a wireless node to a relay in the wireless communications system of FIG. 1, 2A, or 2B.

FIG. 8C is a flowchart of a process for associating a wireless node to a relay in the wireless communications system of FIGS. 1 and 2A-B. In an embodiment, process 875 may be performed by a relay, such as relay 105*a-c* illustrated in FIGS. 2A-B and FIG. 4. In processing block 876, an association request is transmitted to an access point. In an embodiment, the access point may be a relay. In some aspects, process 875 may include a block that determines a transmitter address to use for the association request. In some of these aspects, the transmitter address may vary for each or at least a portion of the association requests transmitted to the access point by block 876. By utilizing a different or unique transmitter address for each association request, messages received from the access point relating to a particular association can be identified by a receiver address specified in the message. A station corresponding to the association may then be determined based on the receiver address. In one aspect, this may implement a method of routing between an access point and a station by a relay, similar to that described by process 800 and illustrated by FIG. 8A.

In block 877, an association response is received from the access point. In block 878, association identifying information is added to an association pool. Decision block 879 determines whether an association pool size has been reached. In the embodiment illustrated by FIG. 8C, the node performing process 875 may generate a pool of access point associations. The pool of associations may be utilized to provide wireless communication services to wireless nodes that associate with the node running process 875.

This pool of associations may be formed before any association requests are received. The pool of associations may provide an ability to respond to a received association request without necessarily needing to communicate with an access point or relay to form an association when the association request is received. This may reduce the latency associated with responding to association requests.

If the pool size has not been reached in block 879, process 875 returns to block 876 and processing continues. If the pool size has been reached, an association request is received from a wireless node in block 880. In an embodiment, the wireless node may be a station. In an embodiment, the wireless node may be a relay. In block 881, the association pool is searched for an access point association. In block 882, an association reply is transmitted to the wireless node based on the search. If the search performed in block 881 identifies that the pool includes a preexisting association with an access point, this preexisting association may be used to respond to the association request received in block 880.

Figure 8D:
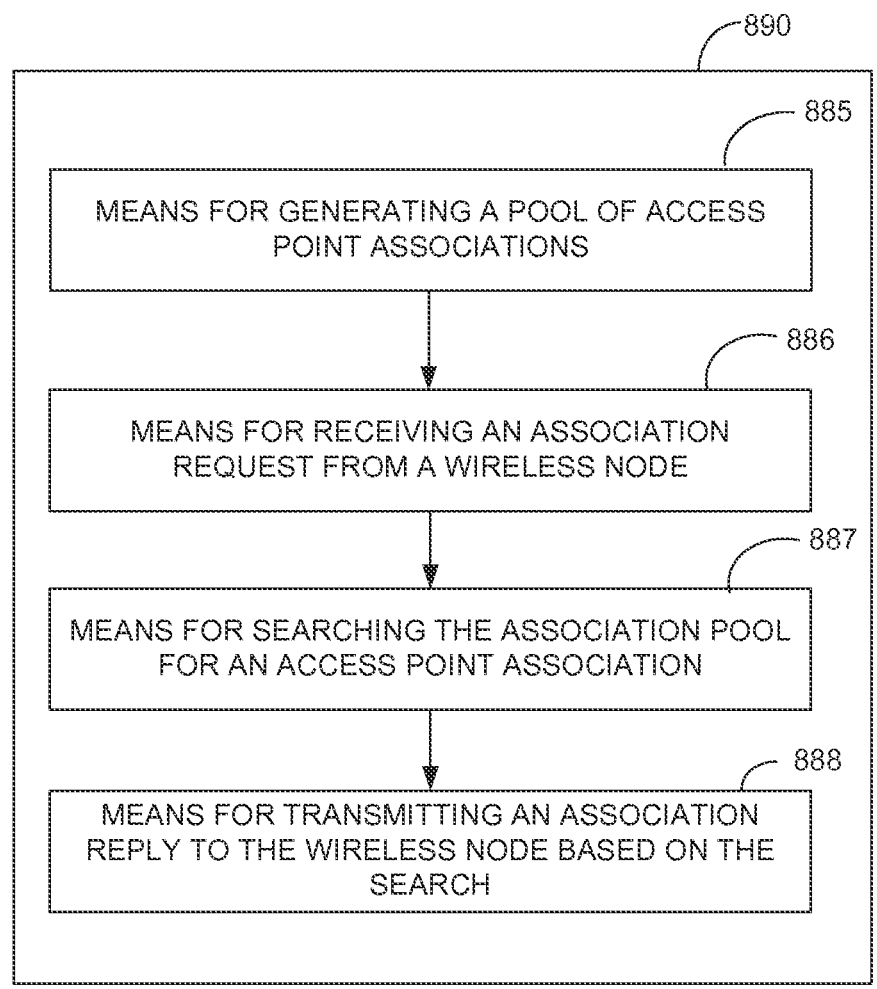
FIG. 8D is a functional block diagram of an exemplary device 890 that may be employed within the wireless communication system 100, 200, or 250.

FIG. 8D is a functional block diagram of an exemplary device 890 that may be employed within the wireless communication system 100, 200, or 250. The device 890 includes means 885 for generating a pool of access point associations. In an embodiment, means 885 may be configured to perform one or more of the functions discussed above with respect to blocks 876-879. In an embodiment, the means for generating a pool of access point associations may include a processor, such as processor 304 of FIG. 3. Means 885 may also include one or more of a signal generator, transceiver, decoder, or a combination of hardware and/or software component(s), circuits, and/or module(s). The device 875 further includes means 886 for receiving an association request from a wireless node. In an embodiment, means 886 may be configured to perform one or more of the functions discussed above with respect to block 880. The means 886 for receiving an association request from a wireless node may include a receiver, such as receiver 312 of FIG. 3. Means 886 may also include one or more of a processor, signal generator, transceiver, decoder, or a combination of hardware and/or software component(s), circuits, and/or module(s). The device 875 further includes means 887 for searching the association pool for an access point association. In an embodiment, means 887 may be configured to perform one or more of the functions discussed above with respect to block 881. In an embodiment, the means for searching may include a processor, such as processor 304 of FIG. 3. Means 887 may also include one or more of a signal generator, transceiver, decoder, or a combination of hardware and/or software component(s), circuits, and/or module(s). The device 875 further includes means 888 for transmitting an association reply to the wireless node based on the search. In an embodiment, means 888 may be configured to perform one or more of the functions discussed above with respect to block 882. In an embodiment, the means for transmitting an association reply to the wireless node based on the search may include a transmitter, such as transmitter 310 of FIG. 3. Means 888 may also include one or more of a processor, signal generator, transceiver, decoder, or a combination of hardware and/or software component(s), circuits, and/or module(s).

Figure 9:
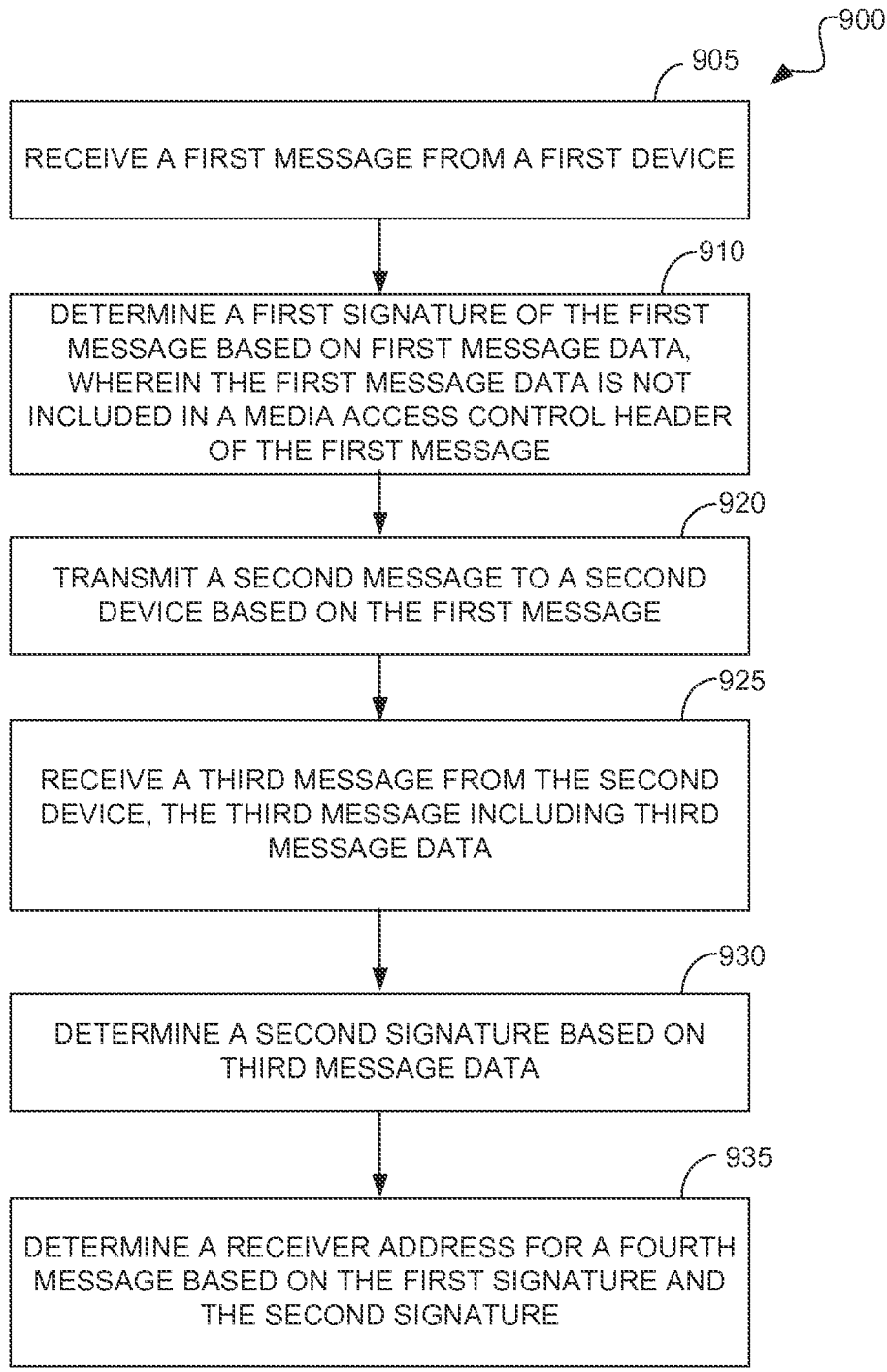
FIG. 9 is a flowchart of a process for transmitting data from a wireless node to an access point (AP) in the wireless communications system of FIGS. 1 and 2A-B.

FIG. 9 is a method of routing messages between a first wireless device and a second wireless device in the wireless communications system of FIG. 1, 2A-B, or 7. In an embodiment, process 900 may be performed by a relay, such as relay 105*a-c* illustrated in FIGS. 2A-B and FIG. 4.

In block 905, a first message is received from a first device. In block 910, a first signature of the first message is determined based on first message data. The first message data is not included in a media access control header of the first message. In one aspect first message data may include a source IP address of the first device. In this aspect, a media access control source address of the first device, included in the first message, may also be included as part of the signature. In another aspect, the signature may be based on application data located "above" Internet Protocol (IP) header data in the message. As is known in the art, first data located "above" second data in a network message or packet is located at a larger offset from the start of the packet or message than second data.

In some aspects, a determination may be made that first message data includes data corresponding to an address resolution protocol (ARP) header. In these aspects, a transaction identifier for the ARP protocol may be determined based on the first message and include as part of the first signature. In some other aspects, a determination may be made that the first message includes data corresponding to the dynamic host resolution protocol (DHCP) header. In these aspects, a transaction identifier for the DHCP protocol may be determined based on the first message and included as part of the first signature.

In block 920, a second message is transmitted to a second device based on the first message. In one aspect, the second device may be a relay or an access point. The second message may differ from the first message in that a transmitter address and receiver address in a media access control header of the second message may be different than a transmitter address and receiver address in a media access control header of the first message. Data not included in the media access control header may be identical in the first message and second message.

In block 925, a third message is received from the second device. The third message includes third message data. In some aspects, the third message may correspond to the second message transmitted to the second device. For example, the second message may be a request of the second device while the third message is a reply to the request.

In block 930, a second signature is determined based on third message data. In one aspect, third message data does not include data included in a media access control header of the third message. In some aspects, block 930 may perform one or more of the functions described above with respect to block 910.

In block 935, a receiver address for a fourth message is determined based on the second signature and the signature data store. In some aspects, the signature data store is searched based on the second signature. For example, in some aspects, the second signature identifies a destination IP address of an IP header included in the third message. The signature data store may be searched for the identified destination IP address. In some aspects, this destination IP address may match a source IP address included as part of the first signature in block 910 and/or 915. The first signature may also include a MAC address of the first device.

In other aspects, the second signature may include a transaction ID from an ARP or DHCP header included in the third message. The signature data store may be searched for a signature including the transaction ID. As discussed above with respect to block 910, a transaction ID included in the first message may have been included in the first signature and stored in the signature data store when block 915 was performed. The first signature may have also include a MAC address of the first device, thus allowing the MAC address of the first device to be determined based on the third message, further based on a transaction ID determined from the third message. In the non-limiting examples discussed above, the receiver address may be determined to be the MAC address of the first device and included in the first signature.

Figure 10:
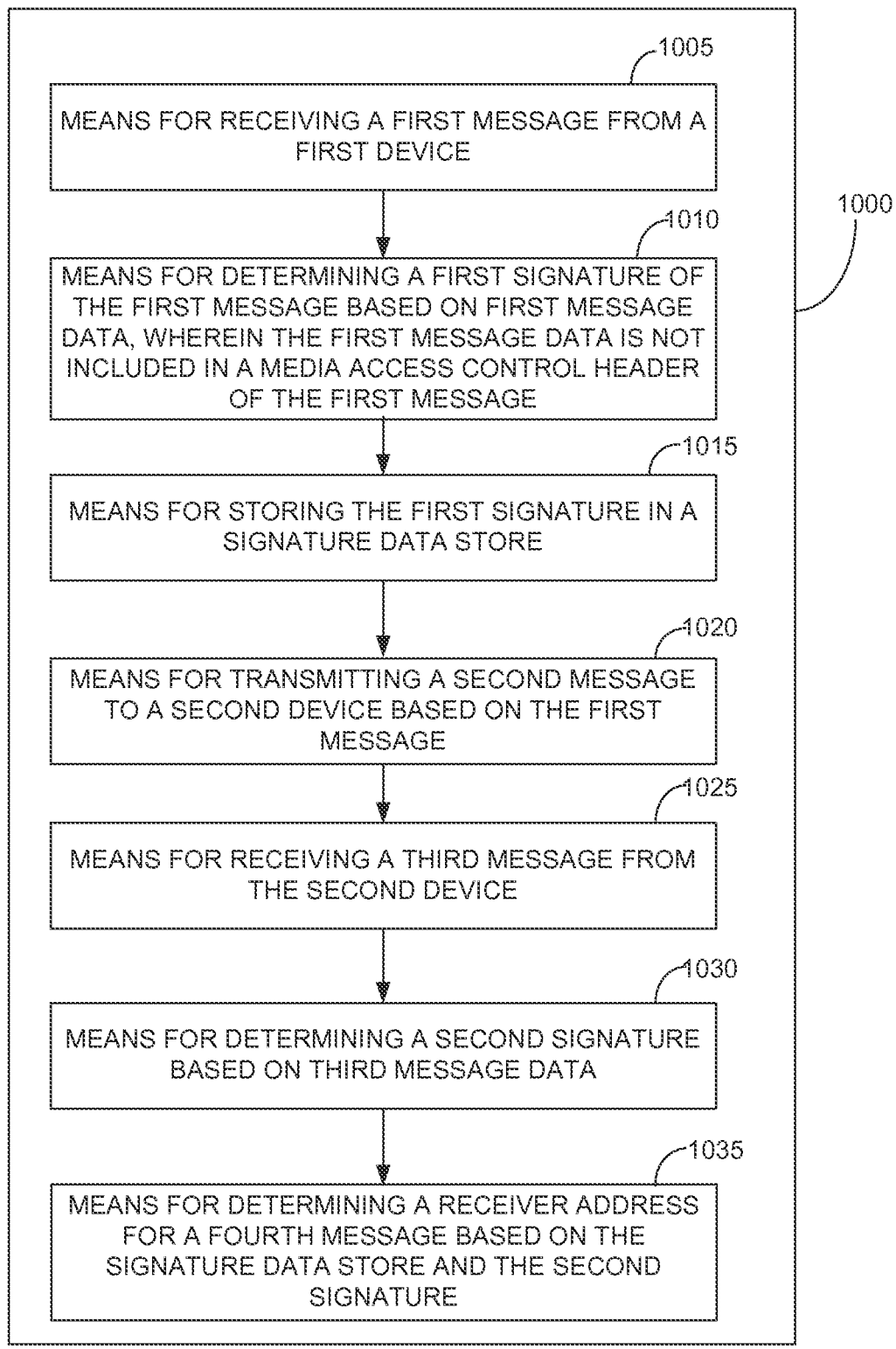
FIG. 10 is a functional block diagram of an exemplary device that may be employed within the wireless communication system 100, 200, or 250.

FIG. 10 is a functional block diagram of an exemplary device 1000 that may be employed within the wireless communication system 100, 200, 250, or 700. The device 1000 includes means 1005 for receiving a first message from a first device. In an embodiment, means 1005 may be configured to perform one or more of the functions discussed above with respect to block 905. In an embodiment, the means for receiving a first message from a first device may include a receiver, such as receiver 312 of FIG. 3. Means 1005 may also include one or more of a signal generator, transceiver, decoder, or a combination of hardware and/or software component(s), circuits, and/or module(s). The device 1000 further includes means 1010 for determining a first signature of the first message based on first message data, wherein the first message data is not included in a media access control header of the first message. In an embodiment, means 1010 may be configured to perform one or more of the functions discussed above with respect to block 910. The means 1010 for determining may include a processor, such as processor 304 of FIG. 3. Means 1010 may also include one or more of a processor, signal generator, transceiver, decoder, or a combination of hardware and/or software component(s), circuits, and/or module(s). The device 1000 further includes means 1015 for storing the first signature in a signature data store. In an embodiment, means 1015 may be configured to perform one or more of the functions discussed above with respect to block 915. In an embodiment, the means for storing may include a processor, such as processor 304 of FIG. 3. Means 1015 may also include one or more of a signal generator, transceiver, decoder, or a combination of hardware and/or software component(s), circuits, and/or module(s).

The device 1000 further includes means 1020 for transmitting a second message to a second device based on the first message. In an embodiment, means 1020 may be configured to perform one or more of the functions discussed above with respect to block 920. In an embodiment, the means for transmitting may include a transmitter, such as transmitter 310 of FIG. 3. Means 1020 may also include one or more of a signal generator, transceiver, decoder, or a combination of hardware and/or software component(s), circuits, and/or module(s). The device 1000 further includes means 1025 for receiving a third message from the second device. In an embodiment, means 1025 may be configured to perform one or more of the functions discussed above with respect to block 925. In an embodiment, the means for receiving 1025 may include a receiver, such as receiver 312 of FIG. 3. Means 1025 may also include one or more of a signal generator, transceiver, decoder, or a combination of hardware and/or software component(s), circuits, and/or module(s). The device 1000 further includes means 1030 for determining a second signature based on the third message data. In an embodiment, means 1030 may be configured to perform one or more of the functions discussed above with respect to block 930. In an embodiment, the means for determining may include a processor, such as processor 304 of FIG. 3. Means 1030 may also include one or more of a signal generator, transceiver, decoder, or a combination of hardware and/or software component(s), circuits, and/or module(s). The device 1000 further includes means 1035 for determining a receiver address for a fourth message based on the signature data store and the second signature. In an embodiment, means 1035 may be configured to perform one or more of the functions discussed above with respect to block 935. In an embodiment, the means for determining may include a processor, such as processor 304 of FIG. 3. Means 1035 may also include one or more of a signal generator, transceiver, decoder, or a combination of hardware and/or software component(s), circuits, and/or module(s).

Figure 11:
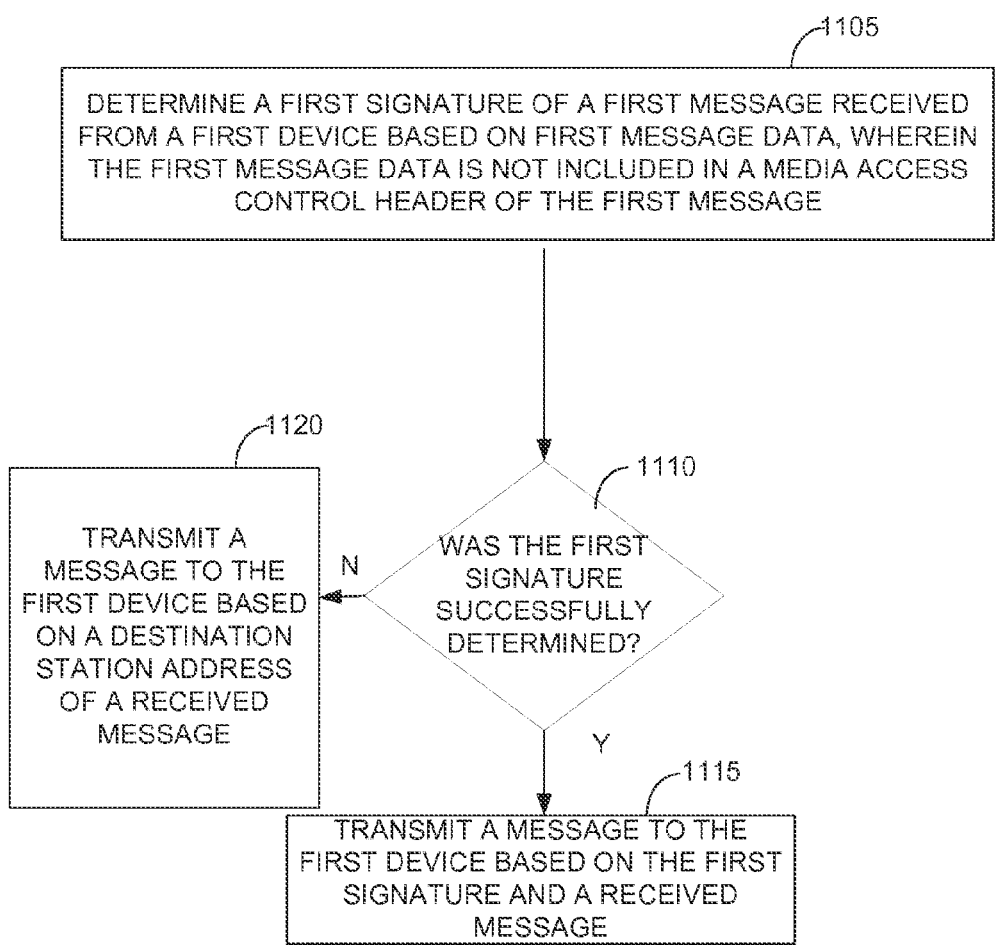
FIG. 11 is a flowchart of a process for transmitting data from an AP to a wireless node in the wireless communications system of FIG. 1, 2A-B, or 13.

FIG. 11 is a method of routing messages between a first wireless device and a second wireless device in the wireless communications system of FIG. 1, 2A-B, or 7. In an embodiment, process 1100 may be performed by a relay, such as relay 105*a-c* illustrated in FIGS. 2A-B and FIG. 4.

In block 1105, process 1100 attempts to determine a first signature of a first message received from a first device based on first message data, wherein the first message data is not included in a media access control header of the first message. In some aspects, block 1105 may perform one or more of the functions discussed above with respect to block 910. In addition to the functions discussed with respect to block 10, block 1105 may determine if a signature was successfully determined from the first message.

Decision block 1110 evaluates whether a signature was successfully determined. If a signature was successfully determined, process 1100 moves to block 1115, where a message is transmitted to the first device based on the first signature and a received message. Block 1115 may operate substantially in accordance with process 900, discussed above.

If a signature was not successfully determined in block 1105, process 1100 moves from decision block 1110 to block 1120, where a message is transmitted to the first device based on a destination station address specified in a received message. For example, a destination address specified in a media access control header of a received message may be used to route or transmit messages to the first device. In some aspects, an association may be created between a particular station address and the first device. As long as the association is maintained, messages received with the particular station address are routed to the first device. In some aspects, message transmitting in block 1120 may be performed substantially in accordance with processes 800 or 875, described with respect to FIG. 8A or 8C respectively.

Figure 12:
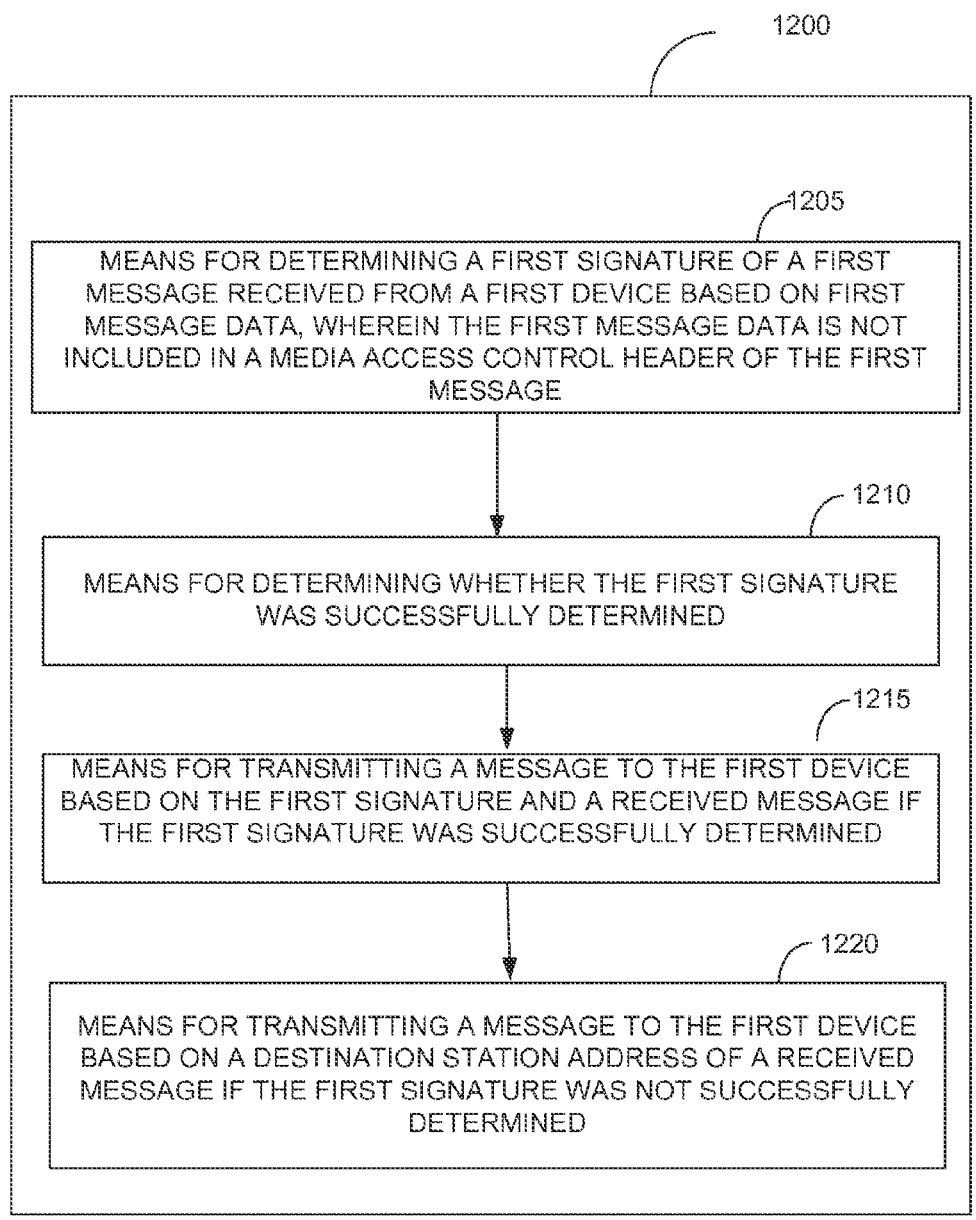
FIG. 12 is a functional block diagram of an exemplary device 1200 that may be employed within the wireless communication system 100, 200, 250, or 1300.

FIG. 12 is a functional block diagram of an exemplary device 1200 that may be employed within the wireless communication system 100, 200, 250, or 700. The device 1200 includes means 1205 for determining a first signature of a first message received from a first device based on first message data, wherein the first message data is not included in a media access control header of the first message. In an embodiment, means 1005 may be configured to perform one or more of the functions discussed above with respect to block 1105. The means 1205 for determining may include a processor, such as processor 304 of FIG. 3. Means 1205 may also include one or more of a processor, signal generator, transceiver, decoder, or a combination of hardware and/or software component(s), circuits, and/or module(s). The device 1200 further includes means 1210 for determining whether the first signature was successfully determined. In an embodiment, means 1210 may be configured to perform one or more of the functions discussed above with respect to block 1110. The means 1210 for determining may include a processor, such as processor 304 of FIG. 3. Means 1210 may also include one or more of a processor, signal generator, transceiver, decoder, or a combination of hardware and/or software component(s), circuits, and/or module(s). The device 1200 further includes means 1215 for transmitting a message to the first device based on the first signature and a received message if the first signature was successfully determined. In an embodiment, means 1215 may be configured to perform one or more of the functions discussed above with respect to block 1115. In an embodiment, means 1215 may be configured to perform one or more of the functions discussed above with respect to device 850. The means 1215 for transmitting may include a transmitter, such as transmitter 310 of FIG. 3. Means 1215 may also include one or more of a processor, signal generator, transceiver, decoder, or a combination of hardware and/or software component(s), circuits, and/or module(s). The device 1200 further includes means 1220 for transmitting a message to the first device based on a destination station address of a received message if the signature was not successfully determined. In an embodiment, means 1220 may be configured to perform one or more of the functions discussed above with respect to block 1120. In an embodiment, means 1220 may be configured to perform one or more of the functions discussed above with respect to device 1100. The means 1220 for transmitting may include a transmitter, such as transmitter 310 of FIG. 3. Means 1220 may also include one or more of a processor, signal generator, transceiver, decoder, or a combination of hardware and/or software component(s), circuits, and/or module(s).

Figure 13:
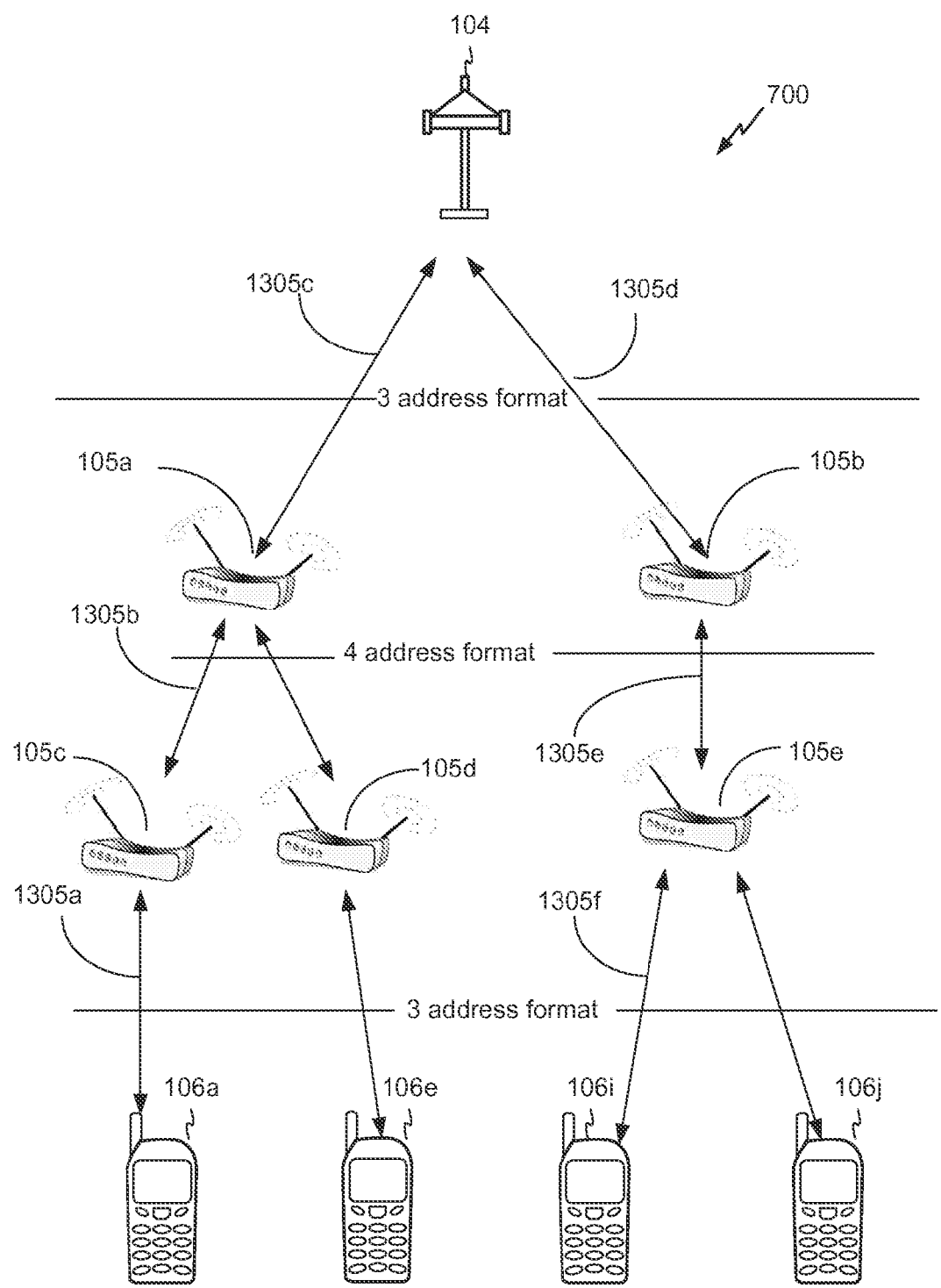
FIG. 13 shows an exemplary wireless communication system 1300. The wireless communication system 1300 may operate pursuant to a wireless standard, for example any one of the 802.11 standards.

FIG. 13 shows an exemplary wireless communication system 1300. The wireless communication system 1300 may operate pursuant to a wireless standard, for example any one of the 802.11 standards. Shown in FIG. 13 is an access point 104, two relays 105a-b, three relays 105c-e, and four mobile devices 106a, 106e, 106i, and 106j.

As shown in FIG. 13, relays 105a-b communicate with the AP 104 using messages containing a MAC header that includes 3 addresses. Relays 105c-e communicate with relays 105a-b utilizing a messages utilizing a MAC header that includes four addresses. Mobile devices 106a, 106e, 106i, and 106j communicate with relays 105c-e using messages including MAC headers that contain three addresses.

As an illustrative example of methods and apparatus disclosed herein, a mobile device or station, such as STA 106a, may communicate over wireless network 1300 using a multicast destination address. Upon station 106a transmitting a multicast message over network path 1305a, the message may be received by relay 105c. Relay 105c may then communicate the message over network path 1305b to relay 105a. Relay 105a may then communicate the multicast message over network path 1305c to AP 104. Table 1 below shows the format of an uplink multicast message as it is transmitted from STA 106a to relay 105c, to relay 105a, and then to AP 104.

TABLE 1

|  | Network Path | A1 | A2 | A3 | A4 |
|---|---|---|---|---|---|
| 106a to 105c | 1305a | 105c | 106a | MC |  |
| 105c to 105a | 1305b | 105a | 105c | MC | 106a |
| 105a to AP 104 | 1305c | AP 104 | V1 | MC |  |

Table one shows the address fields of a MAC header utilizing three address fields when an uplink multicast message is transmitted from STA 106a to relay 105c. Note that the multicast message illustrated by Table 1 includes three address fields, "A1," "A2," and "A3." When the multicast message is transmitted over network path 1305a, the A1 field indicates the receiver address of 105c, while the A2 field operates as a transmitter address and indicating 106a's network address. The A3 field indicates a multicast destination address. When forwarding the multicast message to relay 105a over network path 1305b, relay 105c utilizes a network message using a MAC header with four address fields. Relay 105c sets the A1 receiver address field to relay 105a's network address, and the A2 transmitter address field to 105c's own network address. The multicast address is indicated in the A3 field, while the source network address of STA 106a is indicated in the A4 field.

Relay 105a then transmits the multicast message to the AP 104 over network path 1305c. Relay 105c sets the receiver address or A1 field to a network address of the AP 104. The relay 105a also determines a virtual address to utilize as its own address when transmitting the multicast message to the AP 104. For example, in some aspects, the relay 105c may maintain a pool of virtual network addresses that it may use as a transmitter address when transmitting a message with a multicast destination address. The relay 105c may establish a mapping between a source address, indicated in a received multicast message, and a particular virtual network address. Table 1 shows relay 105a setting the transmitter address field A2 of a multicast message to a virtual network address "V1."

Upon receiving the multicast message from relay 105a, the AP 104 may retransmit the multicast message as a downlink message as shown in Table 2 below.

TABLE 2

|  | Network Path | A1 | A2 | A3 | A4 |
|---|---|---|---|---|---|
| AP 104 to 105b | 1305d | MC | AP 104 | V1 |  |
| 105b to 105c | 1305e | MC | 105b | V1 |  |
| 105c to STA 106j | 1305f | MC | 105e | V1 |  |

Table two shows that AP 104 transmits the multicast message to relay 105b over network path 1305d, and sets the A1 field, which is interpreted as a receiver address on a downlink packet, to the multicast address. The A2 field, which is interpreted as a transmitter address in a downlink message, is set to the network address of the AP 104. The A3 field, which is interpreted as a source address in a downlink message is set to the virtual address. Note the AP received an uplink message from relay 105a over network path 1305c that had a transmitter address set to the virtual address "V1." The relay 105b then transmits the message over network path 1305e to relay 105e. The A1 field is set to the multicast address, while the A2 field is set to a network address of the relay 105b. The A3 field, which functions as a source address in a downlink message is set to the virtual address. The multicast message is then received by STA 106i when relay 105e transmits the message over network path 1305f, setting the A2 field to 105e's network address, and the A1 field to the multicast address.

Table three below illustrates the address field settings of a network message generated in response to STA 106i receiving the multicast message discussed above.

TABLE 3

|  | Network Path | A1 | A2 | A3 | A4 |
|---|---|---|---|---|---|
| 106i to 105e | 105f | 105e | 106i | V1 |  |
| 105e to 105b | 1305e | 105b | 105e | V1 | 106i |
| 105b to AP 104 | 1305d | AP 104 | 105b | V1 |  |
| AP 104 to 105a | 1305c | V1 | AP 104 | 105b |  |
| 105a to 105c | 1305b | 105c | 105a | 106a | 105b |
| 105c to 106a | 1305a | 106a | 105c | 105b |  |

Station 106i transmits a response message over network path 1305f to relay 105e. As shown in table three, the response message has an A1 field set to a network address of relay 105e. The A2 field, which operates as a source address in uplink frames with three address format, is set to the network address of responding station 106i. The A3 field, operating as a destination address, is set to the virtual address, which responding STA 106i received in the A1 field of the multicast downlink message. Upon receiving the response message, relay 105e forwards the message along network path 1305e to relay 105b. Because the link between relays 105b and 105e utilizes a packet with four address fields, relay 105e indicates the source address 106i in the A4 field. Because this response is an uplink packet, the A1 field is set as a receiver address to 105b, while the A2 field operates as a source address field. The A3 field operates as a destination address field and is set to the virtual address "V1."

Relay 105b then forwards the response message over network path 1305d to the AP 104. As shown in table 2 above, the message transmitted over path 1305d utilizes only three addresses. Upon receiving the response message, the AP 104 forwards the message towards the destination address of V1 along network path 1305c. The message utilizes a three address format, with the A1 field operating as a receiver address and is set to the virtual address V1. The A2 field operates as a transmitter address and is set to the network address of the AP 104, while the A3 field operates as a source address and is set to the network address of relay 105b.

Upon receiving the response message, relay 10a forwards the message to relay 105c over network path 1305b. Because the network path 1305b utilizes a MAC header that includes four network addresses, relay 105a sets the A3 field, which operates as a destination address, to 106a. The A4 field operates as a source address field and is set to the network address of relay 105b. The A1 field operates as a receiver address and is set to relay 105c's address, while the A2 field operates as a transmitter address and is set to relay 105a's network address.

Upon receiving the response message, relay 105c forwards the message to station 106a over network path 1305a. The message transmitted over network path 1305a utilizes a MAC header including only three addresses. The A1 field functions as a receiver address and is set to the network address of STA 106a. The A2 field operates as a transmitter address and therefore is set to the network address of relay 105c. The A3 field operates as a source address and is set to the relay 105b. Note that the above is just one example of how a multicast address may be forwarded over a series of network paths utilizing both three and four address formats.

Figure 14:
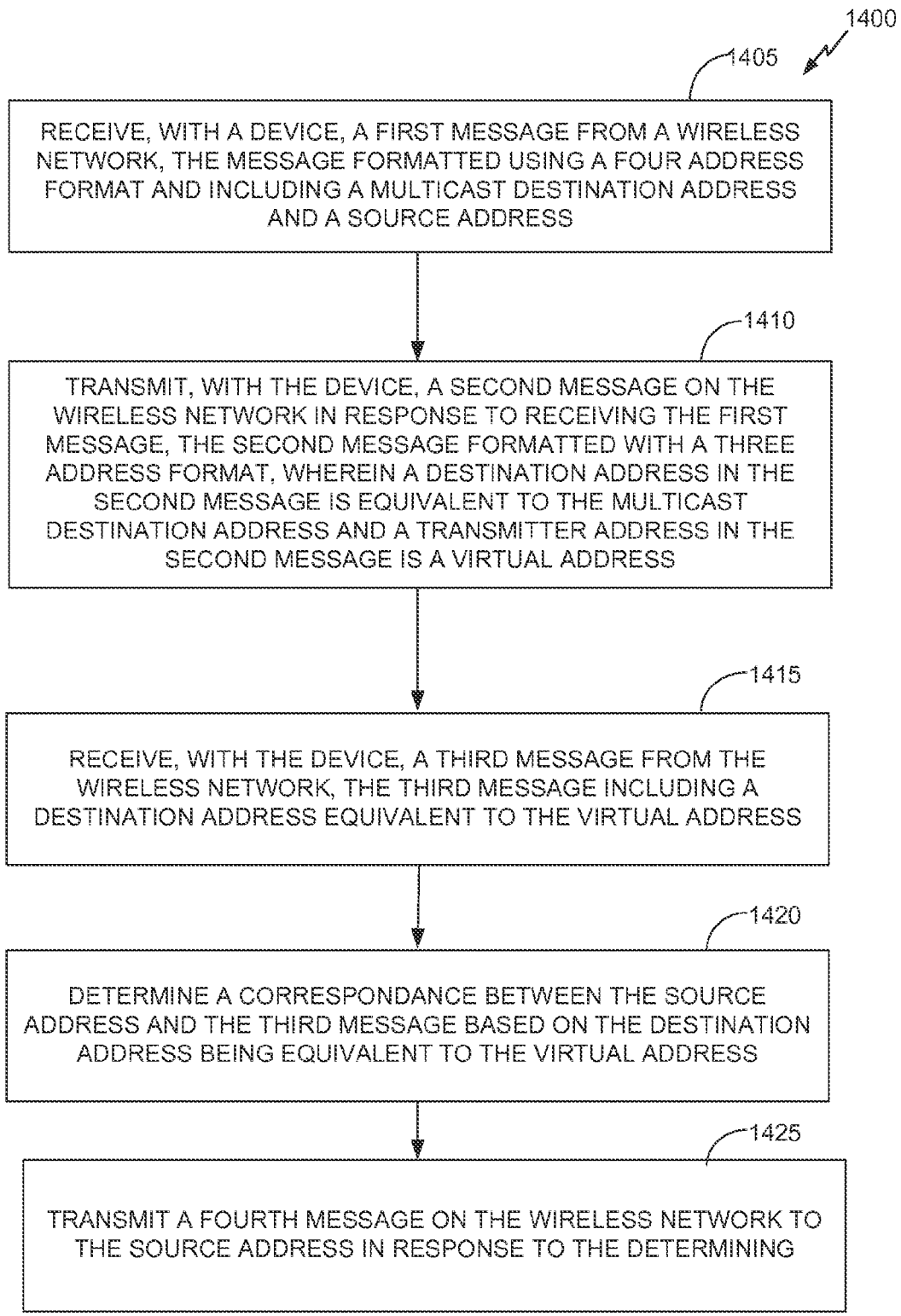
FIG. 14 is a flowchart of a process for relaying multicast data in the wireless communication system of FIG. 1, 2A, or 13.

FIG. 14 is a flowchart of a process for relaying multicast data in the wireless communication system of FIG. 1, 2A, or 13. In one aspect, process 1400 may be performed by a relay, for example, relay 105a of FIG. 13. In block 1405, a first message is received from a wireless network with a device. The message is formatted using a four address format and includes a multicast destination address and a source address. In some aspects, the first message is an uplink message. In some aspects, the multicast address may be specified in the A3 field of the first message. The source address may be a node initially generating or creating the multicast first message.

In block 1410, a second message is transmitted by the device on the wireless network. The second message is transmitted in response to receiving the first message. The second message is formatted with a three address format. In some aspects, the second message is an uplink message. A destination address in the second message is equivalent to the multicast destination address. The destination address may be specified in the second message in an "A1" field. A transmitter address field in the second message is a virtual network address, and may be specified in an A2 field in some aspects.

In block 1415, a third message is received by the device from the wireless network. The third message includes a destination address equivalent to the virtual address. In some aspects, the third message utilizes a three address format. In some aspects, the third message is a downlink message. In some aspects, the virtual address is specified in an A1 field of the message.

In block 1420, a correspondence between the source address and the third message is determined based on the destination address being equivalent to the virtual address. In some aspects, the correspondence is determined by the device. As discussed above, in some aspects, a relay may allocate a virtual address for use when forwarding an uplink multicast packet. The relay may also store a correspondence between the allocated virtual address and a source address of a received multicast packet. When a response to the multicast message is received on the virtual network address, the relay may be able to identify the source address based on the received virtual network address. This may allow the relay to appropriately forward the response to the source, despite use of the three address format.

In block 1425, a fourth message is transmitted on the wireless network to the source address in response to the determining. In some aspects, the fourth message is a forwarded version of the third message. In some aspects, the fourth message is transmitted by the device.

Figure 15:
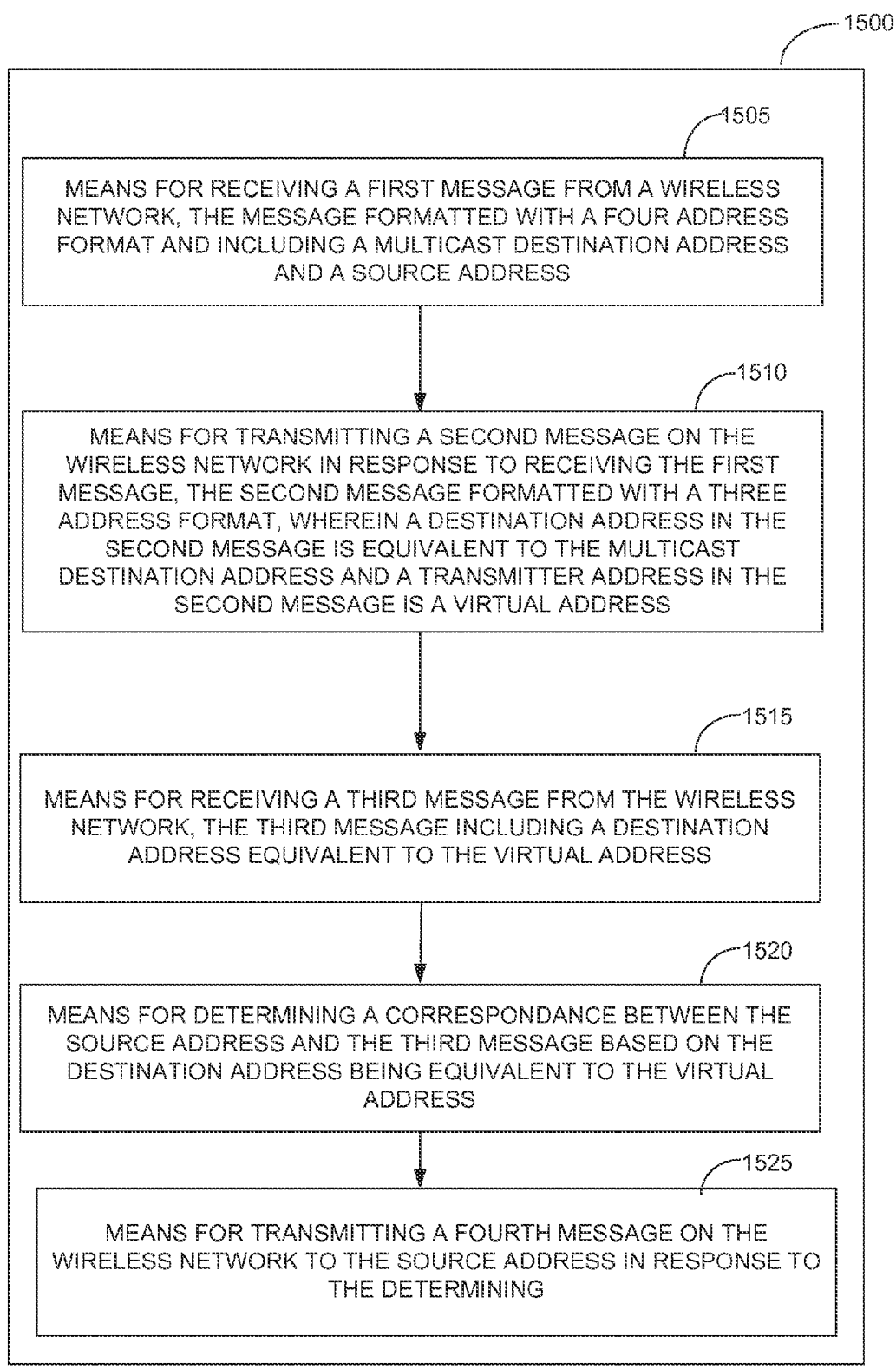
FIG. 15 is a functional block diagram of an exemplary device 1500 that may be employed within the wireless communication system 100, 200, 250, or 1300.

FIG. 15 is a functional block diagram of an exemplary device 1500 that may be employed within the wireless communication system 100, 200, 250, or 1300. The device 1500 includes means 1505 for receiving a first message from a wireless network, the message formatted with a four address format and including a multicast destination address and a source address. In an embodiment, means 1505 may be configured to perform one or more of the functions discussed above with respect to block 1405. The means 1505 for receiving may include a receiver, such as receiver 312 of FIG. 3. Means 1505 may also include one or more of a processor, signal generator, transceiver, decoder, or a combination of hardware and/or software component(s), circuits, and/or module(s). The device 1500 further includes means 1510 for transmitting a second message on the wireless network in response to receiving the first message, the second message formatted with a three address format, wherein a destination address in the second message is equivalent to the multicast destination address and a transmitter address in the second message is a virtual address. In an embodiment, means 1210 may be configured to perform one or more of the functions discussed above with respect to block 1410. The means 1510 for transmitting may include a transmitter, such as transmitter 310 of FIG. 3. Means 1510 may also include one or more of a processor, signal generator, transceiver, decoder, or a combination of hardware and/or software component(s), circuits, and/or module(s). The device 1500 further includes means 1515 for receiving a third message from the wireless network, the third message including a destination address equivalent to the virtual address. In an embodiment, means 1515 may be configured to perform one or more of the functions discussed above with respect to block 1415. The means 1515 for receiving may include a receiver, such as transmitter 312 of FIG. 3. Means 1515 may also include one or more of a processor, signal generator, transceiver, decoder, or a combination of hardware and/or software component(s), circuits, and/or module(s). The device 1500 further includes means 1520 for determining a correspondence between the source address and the third message. In an embodiment, means 1520 may be configured to perform one or more of the functions discussed above with respect to block 1420. The means 1520 for determining may include a processor, such as processor 304 of FIG. 3. Means 1520 may also include one or more of a processor, signal generator, transceiver, decoder, or a combination of hardware and/or software component(s), circuits, and/or module(s). The device 1500 further includes means 1525 for transmitting a fourth message on the wireless network to the source address in response to the determining. In an embodiment, means 1525 may be configured to perform one or more of the functions discussed above with respect to block 1425. The means 1520 for transmitting may include a transmitter, such as transmitter 210 of FIG. 3. Means 1520 may also include one or more of a processor, signal generator, transceiver, decoder, or a combination of hardware and/or software component(s), circuits, and/or module(s).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of detecting whether an addressing format is supported by an access point on a wireless network, comprising:
    transmitting, by a first device, a request to an access point using an addressing format including a source address field and a separate transmitter address field, wherein the request includes the source address field set to a first address and the transmitter address field set to a second address different from the first address;
    receiving, by the first device, a response to the request from the access point;
    analyzing the response to determine whether the access point transmitted the response to the first address or the second address;
    determining, by the first device, the access point supports the addressing format in response to the access point transmitting the response to the first address and that the access point does not support the addressing format in response to the access point transmitting the response to the second address; and
    receiving, by the first device, first and second association requests from first and second stations respectively;
    relaying, by the first device, the first association request to the first access point using a first transmitter address;
    relaying, by the first device, the second association request to the first access point using a second transmitter address different than the first transmitter address in response to the first access point not supporting the addressing format; and
    relaying, by the first device, the second association request to the first access point using the first transmitter address in response to the first access point supporting the addressing format.

2. The method of claim 1, wherein the access point is determined to support the addressing format if the access point transmits a response to the request that includes a destination address equal to the first address.

3. The method of claim 1, further comprising
    in further response to the first access point not supporting the addressing format:
        receiving a first association response from the first access point, the first association reply including a receiver address,
        in response to the first association reply including the first transmitter address as the receiver address:

associating the first association reply with the first station, and transmitting an association response to the first station based on the first association reply, in response to the first association reply including the second transmitter address as the receiver address:

associating the first association reply with the second station, and transmitting an association response to the second station based on the first association reply.

4. The method of claim 1, further comprising transmitting a second request to the access point using the addressing format based, at least in part, on the determining.

5. The method of claim 1, wherein the request is a ping request.

6. The method of claim 1, wherein the first address does not identify any device on the wireless network.

7. The method of claim 1, wherein the transmitted request is one of an address protocol resolution (ARP) request, or an Internet Control Message Protocol (ICMP) ping request.

8. An apparatus for detecting whether an addressing format is supported by an access point on a wireless network, comprising:

a transmitter configured to transmit a request to an access point using an addressing format including a source address field and a separate transmitter address field, wherein the request includes the source address field set to a first address and the transmitter address field set to a second address different than the first address;

a receiver configured to receive a response to the request from the access point; and a processor configured to:

analyze the response to determine whether the access point transmitted the response to the first address or the second address;

determine the access point supports the addressing format in response to the access point transmitting the response to the first address and that the access point does not support the addressing format in response to the access point transmitting the response to the second address;

receive first and second association requests from first and second stations respectively, relay the first association request to the first access point using a first transmitter address, relay the second association request to the first access point using a second transmitter address different than the first transmitter address in response to the access point not supporting the addressing format, and relay the second association request to the first access point using the first transmitter address in response to the access point supporting the addressing format.

9. The apparatus of claim 8, wherein the processor is configured to determine that the access point supports the addressing format if the access point transmits a response to the request that includes a destination address equal to the first address.

10. The apparatus of claim 8, wherein the processor is configured to transmit data to the access point based on whether the access point supports the address format.

11. The apparatus of claim 8, wherein the transmitter is further configured to transmit a second request to the access point using the addressing format based, at least in part, on the determining.

12. The apparatus of claim 8, wherein the address format includes a transmitter address, a receiver address, a source address, and a destination address.

13. The apparatus of claim 8, wherein the request is a ping request.

14. The apparatus of claim 8, wherein the first address does not identify any device on the wireless network.

15. The apparatus of claim 8, wherein the transmitter is configured to format the transmitted request as one of an address protocol resolution (ARP) request, or an Internet Control Message Protocol (ICMP) ping request.

16. An apparatus for detecting whether an addressing format is supported by an access point on a wireless network, comprising:

means for transmitting a request to an access point using an addressing format including a source address field and a separate transmitter address field, wherein the request includes the source address field set to a first address and the transmitter address field set to a second address different than the first address;

means for receiving a response to the request from the access point;

means for determining the access point supports the addressing format in response to the access point transmitting the response to the request to the first address and that the access point does not support the addressing format in response to the access point transmitting the response to the request to the second address;

means for receiving first and second association requests from first and second stations;

means for relaying the first association request to the first access point using a first transmitter address;

means for relaying the second association request to the first access point using a second transmitter address different than the first transmitter address in response to the access point not supporting the addressing format; and means for relaying the second association request to the first access point using the first transmitter address in response to the access point supporting the addressing format.

17. The apparatus of claim 16, wherein the means for determining determines that the access point supports the addressing format if the access point transmits a response to the request that includes a destination address equal to the first address.

18. The apparatus of claim 16, further comprising means for transmitting data to the access point based on whether the access point supports the addressing format.

19. The apparatus of claim 16, further comprising a means for transmitting a second request to the access point using the addressing format based, at least in part, on the determining.

20. The apparatus of claim 16, wherein the address format includes a transmitter address, a receiver address, a source address, and a destination address.

21. The apparatus of claim 16, wherein the request is a ping request.

22. The apparatus of claim 16, wherein the first address does not identify any device on the wireless network.

23. The apparatus of claim 16, wherein the means for transmitting a request is configured to transmit the request as one of an address protocol resolution (ARP) request, or an Internet Control Message Protocol (ICMP) ping request.

24. A non-transitory computer readable storage medium comprising instructions that when executed cause a processor to perform the method of:
- transmitting a request from a first device to an access point using an addressing format including a source address field and a separate transmitter address field, wherein the request includes the source address field set to a first address and the transmitter address field set to a second address different than the first address;
- receiving, using the first device, a response to the request from the access point;
- analyzing the response to determine whether the access point transmitted the response to the first address or the second address;
- determining, using the first device, the access point supports the addressing format in response to the access point transmitting the response to the first address and determining the access point does not support the addressing format in response to the access point transmitting the response to the second address;
- receiving, by the first device, first and second association requests from first and second stations;
- relaying, by the first device, the first association request to the first access point using a first transmitter address;
- relaying, by the first device, the second association request to the first access point using a second transmitter address different than the first transmitter address in response to the access point not supporting the addressing format; and
- relaying, by the first device, the second association request to the first access point using the first transmitter address in response to the access point supporting the addressing format.

25. The non-transitory computer readable storage medium of claim 24, wherein the access point is determined to support the addressing format if the access point transmits a response to the request that includes a destination address equal to the first address.

26. The non-transitory computer readable storage medium of claim 24, further comprising transmitting data to the access point based, at least in part, on whether the access point supports the address format.

27. The non-transitory computer readable storage medium of claim 24, further comprising instructions that when executed cause the processor to transmit a second request to the access point using the addressing format based, at least in part, on the determining.

28. The non-transitory computer readable storage medium of claim 24, wherein the addresses format includes a transmitter address, a receiver address, a source address, and a destination address.

29. The non-transitory computer readable storage medium of claim 24, wherein the request is a ping request.

30. The non-transitory computer readable storage medium of claim 24, wherein the first address does not identify any device on the wireless network.

31. The non-transitory computer readable medium of claim 24, wherein the transmitted request is one of an address protocol resolution (ARP) request, or an Internet Control Message Protocol (ICMP) ping request.

32. The method of claim 1 further comprising relaying an association reply received from the first access point to either the first or second station based on whether a receiver address field of the association reply is equivalent to the first or second transmitter address respectively.

33. The apparatus of claim 8, wherein the processor is further configured to relay an association reply received from the first access point to either the first or second station based on whether a receiver address field of the association reply is equivalent to the first or second transmitter address respectively.

34. The non-transitory computer readable medium of claim 24, the method further comprising relaying an association reply received from the first access point to either the first station if a receiver address field of the association reply is equivalent to the first transmitter address or to the second station if the receiver address field of the association reply is equivalent to the second transmitter address.

* * * * *